US008075775B2

(12) United States Patent
Grodecki

(10) Patent No.: US 8,075,775 B2
(45) Date of Patent: Dec. 13, 2011

(54) LEAF FILTER SYSTEM AND REPLACEABLE FILTER LEAF APPARATUS

(76) Inventor: William J. Grodecki, North Olmsted, OH (US)

( * ) Notice: Subject to any disclaimer, the term of this patent is extended or adjusted under 35 U.S.C. 154(b) by 0 days.

(21) Appl. No.: 13/074,150

(22) Filed: Mar. 29, 2011

(65) Prior Publication Data

US 2011/0174715 A1    Jul. 21, 2011

Related U.S. Application Data

(62) Division of application No. 11/265,971, filed on Nov. 3, 2005, now Pat. No. 7,922,905.

(51) Int. Cl.
*B01D 25/12* (2006.01)
*B01D 25/00* (2006.01)
(52) U.S. Cl. ......... 210/346; 210/331; 210/486; 210/231
(58) Field of Classification Search .................. None
See application file for complete search history.

(56) References Cited

U.S. PATENT DOCUMENTS

| | | | |
|---|---|---|---|
| 1,481,931 | A | 1/1924 | Schuhmann |
| 2,063,086 | A | 12/1936 | Fitzgerald |
| 2,381,949 | A | 8/1945 | Goodloe et al. |
| 2,399,784 | A | 5/1946 | Bergman |
| 2,409,705 | A | 10/1946 | Reinhardt |
| 2,547,205 | A | 4/1951 | Hallander |

(Continued)

FOREIGN PATENT DOCUMENTS
EP      0 291 883  A2   5/1998
(Continued)

OTHER PUBLICATIONS

Machine translation from espacenet.com of European Application with Publication No. 0291883 (A2), corresponding to EP 0291883 (A2) cited as a foreign reference on PTO/SB08a attached herewith.

*Primary Examiner* — Nam Nguyen
*Assistant Examiner* — Madeline Gonzalez
(74) *Attorney, Agent, or Firm* — Tucker Ellis & West LLP

(57) ABSTRACT

A filter and replaceable filter leaf apparatus are provided. The filter includes a housing defining a cavity having fluid inlet and outlet ports and a lid member with a manifold coupled to the outlet port and being adapted to conduct a fluid flow between the outlet port and a plurality of attachment areas. Replaceable filter leafs are selectively movable through an opening into the housing cavity and attachable with the manifold at the plurality of attachment areas. The replaceable filter leafs include a filter envelope consisting of a single substantially rectangular filter panel, a nozzle member on the filter panel and defining a passageway adjacent an opening in the filter envelope for conducting fluids therethrough, and a porous grid member contained within the filter envelope. The nozzle member is selectively attachable onto the manifold of the polishing filter apparatus at one of the plurality of attachment areas. In one form, the filter envelope includes a folded rectangular filter panel with the nozzle member disposed at an outer edge thereof. In another embodiment, the nozzle member is located at a crease line formed in the filter panel. In yet another, a pair of filter panels are connected at their edges with the nozzle member located along a selected edge as desired. The filter leaf apparatus are installed onto the manifold along attachment axes extending through the housing opening.

18 Claims, 21 Drawing Sheets

U.S. PATENT DOCUMENTS

| | | |
|---|---|---|
| 2,821,305 A | 1/1958 | Anderson |
| 2,874,848 A | 2/1959 | Cannon et al. |
| 3,481,479 A | 12/1969 | Terhune et al. |
| 3,542,206 A | 11/1970 | Geister |
| 3,654,765 A | 4/1972 | Healy et al. |
| 3,679,062 A | 7/1972 | Burkhart |
| 3,719,279 A | 3/1973 | Leigel-Seitz |
| 4,022,695 A | 5/1977 | Howard et al. |
| 4,303,519 A | 12/1981 | DelVecchio |
| 4,369,112 A | 1/1983 | Vincent et al. |
| 4,446,352 A | 5/1984 | O'Cheskey et al. |
| 4,579,656 A | 4/1986 | Johnson |
| 4,776,958 A | 10/1988 | Stephenson |
| 4,789,474 A | 12/1988 | Gaudfrin |
| 4,790,935 A | 12/1988 | Johnson |
| 4,968,423 A | 11/1990 | McKale et al. |
| 5,000,846 A | 3/1991 | Dietrick et al. |
| 5,013,438 A | 5/1991 | Smith |
| 5,055,192 A | 10/1991 | Artinyan et al. |
| 5,057,217 A | 10/1991 | Lutz et al. |
| 5,720,878 A | 2/1998 | Bolyard |
| 5,882,515 A | 3/1999 | Lacy et al. |
| 5,906,735 A | 5/1999 | O'Rourke |
| 6,280,619 B1 | 8/2001 | Lacy et al. |
| 6,312,598 B1 | 11/2001 | Munson et al. |
| 6,471,863 B2 | 10/2002 | Kojima |
| 6,517,716 B2 | 2/2003 | Munson |
| 6,652,749 B2 | 11/2003 | Stankowski et al. |
| 6,776,906 B2 | 8/2004 | Reid |
| 7,922,905 B2 * | 4/2011 | Grodecki ............ 210/346 |

FOREIGN PATENT DOCUMENTS

| | | |
|---|---|---|
| EP | 0 291 883 A3 | 5/1998 |

* cited by examiner

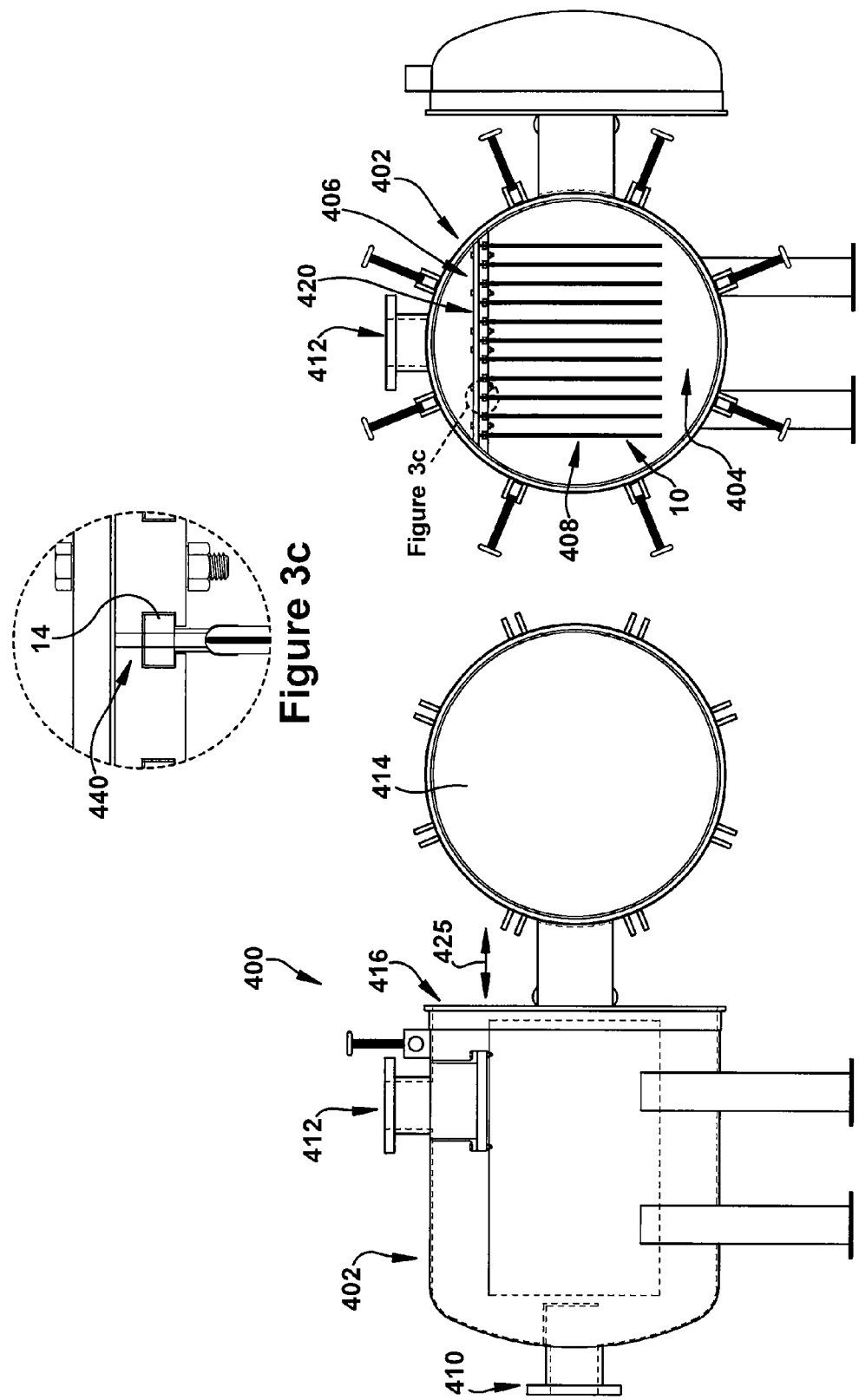

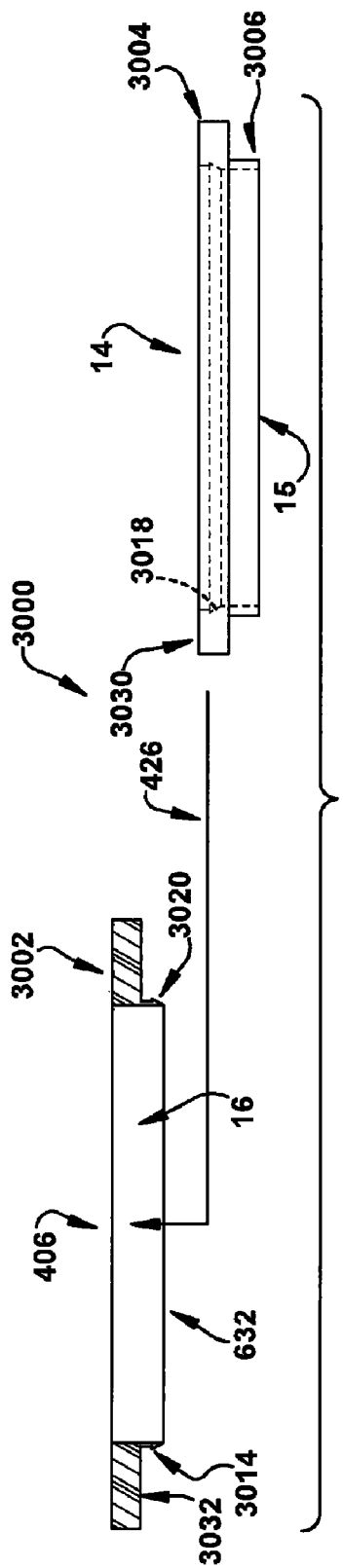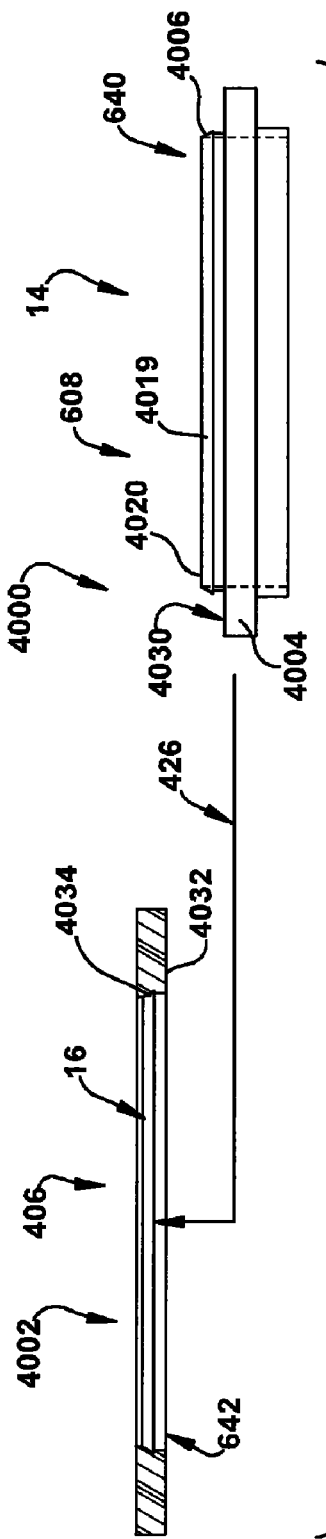

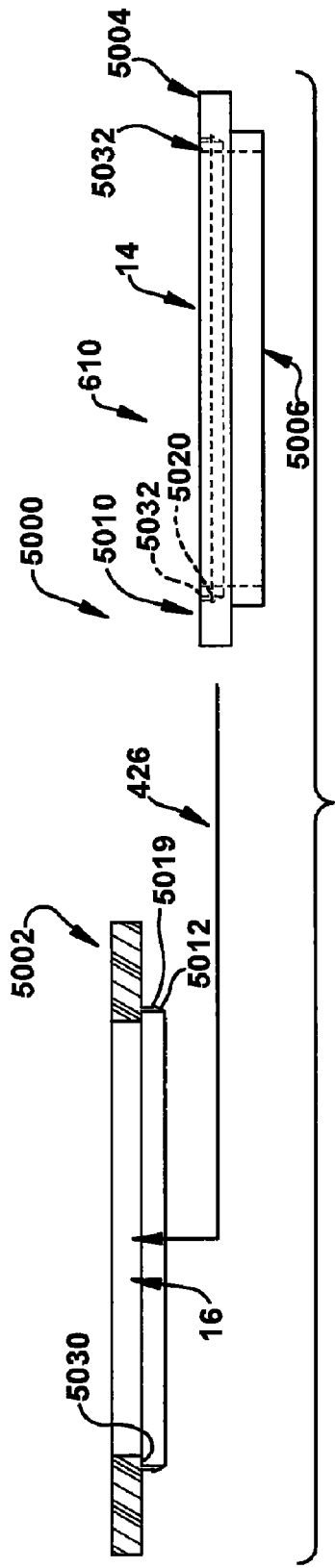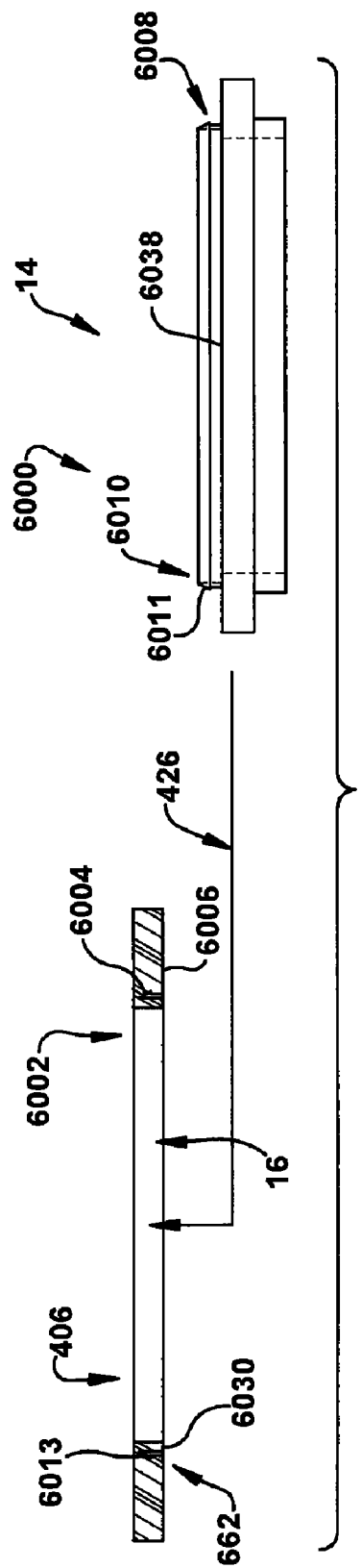

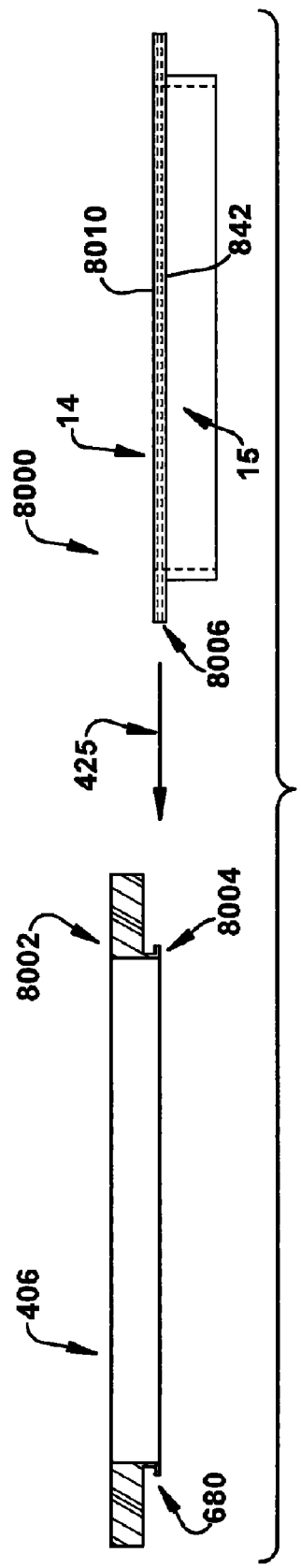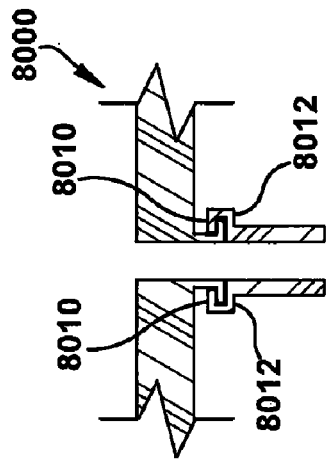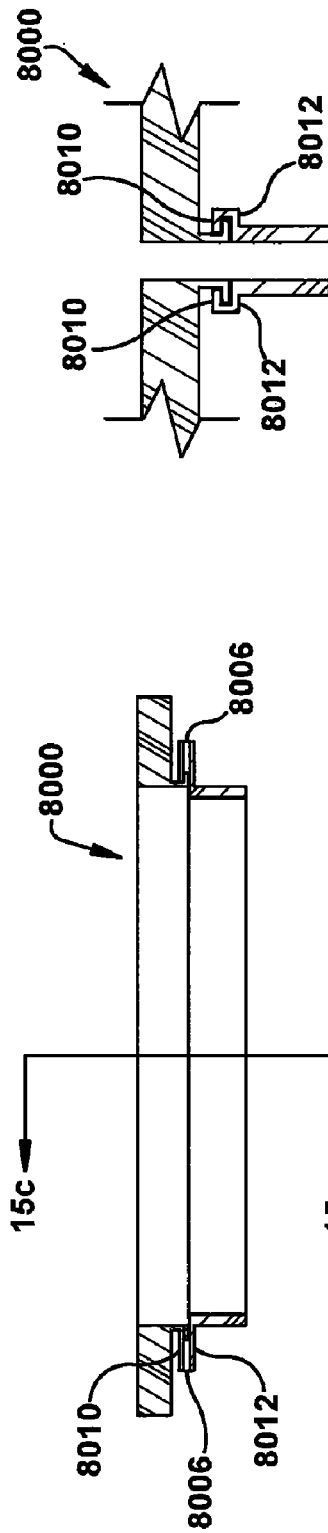

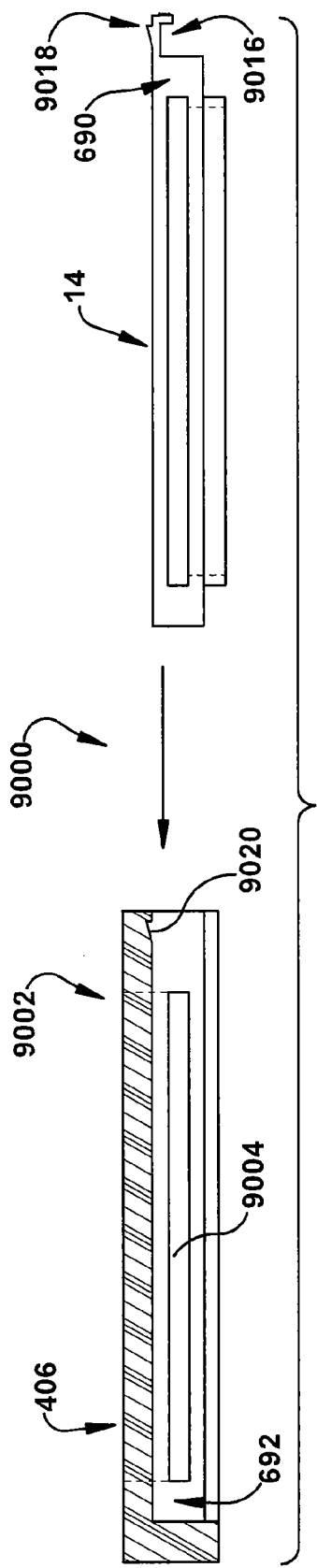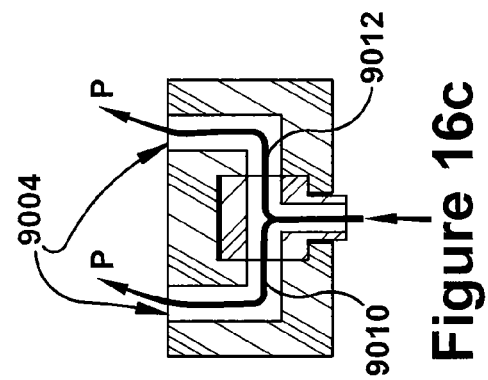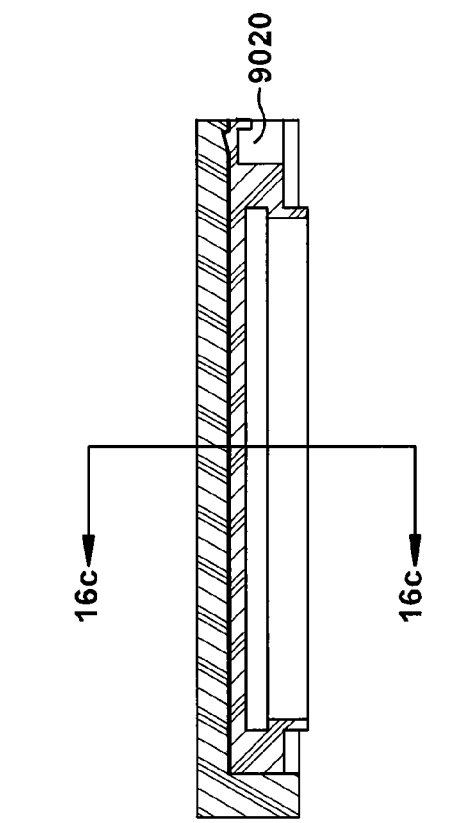

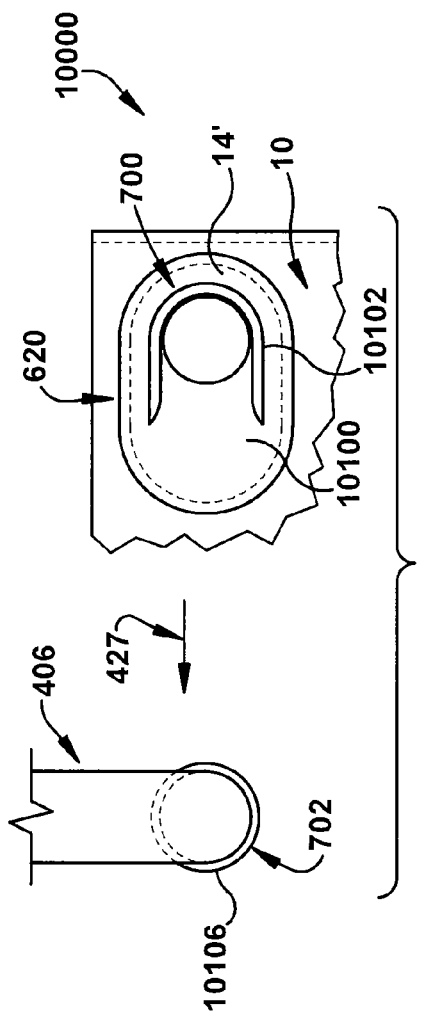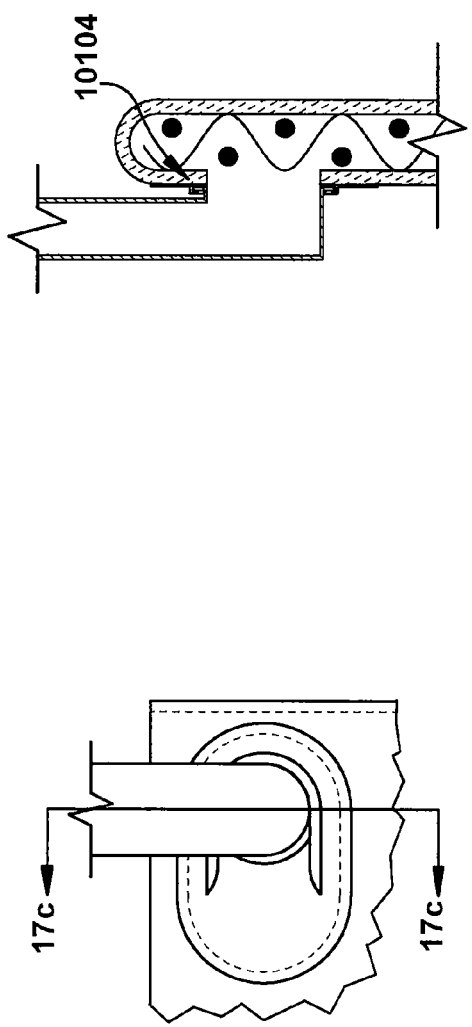

LEAF FILTER SYSTEM AND REPLACEABLE FILTER LEAF APPARATUS

CROSS-REFERENCE TO RELATED APPLICATIONS

This application is a divisional application of U.S. patent application Ser. No. 11/265,971, filed Nov. 3, 2005 now U.S. Pat. No. 7,922,905.

BACKGROUND

The present exemplary embodiments relate to filter apparatus including industrial filters, replaceable filter leafs for use therewith, and methods of using same. They find particular application in connection with polishing filters and will be described with particular reference thereto. However, it is to be appreciated that the present exemplary embodiments are also amenable to other like applications.

Filtration is a common operation performed in process plants and in other industries. One of the many design considerations in the filtration art is the amount of filtration area that can be made available in a given space and cost. On one hand, a large filtration area is preferred because a larger filtration area results in higher filtration rates. Further, large filtration areas reduce or minimize the number of cleaning cycles required for a given volume of filtered material. However, on the other hand, additional considerations such as accessibility and economics motivate designs that are not specifically optimized solely for filtration area as a design parameter.

Essentially, basic filtration is accomplished by passing a fluid such as a liquid or gas bearing solids through a porous media, usually a cloth, paper, sieve, or other structure. Solid particles carried by the fluid are separated from the fluid by the filter media as the fluid passes therethrough.

Many factors influence a determination of filter design. One primary factor of filter design, however, is the degree to which solids being filtered from the fluid can be accumulated onto and, thereafter, removed from the media. At one extreme of design consideration, particles are easily filtered. There, a first filter layer is substantially permeable to the liquid or gas filtrate and permits subsequent layers to be filtered until a substantial cake of deposited particles is formed, at times up to one half inch thick or more. Cake removal usually leaves behind a clean filter media which can then be reused many times. Filters of this type are typically referred to as "process filters" and are used for applications where a cake can be built up onto the media and thereafter removed for reuse of the media several times. Examples include filter presses, leaf filters, drum filters, belt filters, and disc filters. In these cases, maximizing filtration area and providing for solids removal are major design considerations.

On the other extreme of filter design parameter consideration, the filtered particles themselves are small, irregularly shaped, or deformable. They embed themselves into the media and cannot be removed. The used media must therefore be disposed of and replaced with new media. Filters of this type are generally referred to as "polishing filters" and are used with these applications. Polishing filters are designed for ease of media replacement and, to that end, typically include cartridge filters and popular bag filters.

In addition to the above, overall, economics plays a role in filter design, construction, and use. Generally, in process filtration, the solids separated from the filtrate are either a product or a significant by-product of a process around which a business is built. Accordingly, these filters have evolved to large proportions, typically 200 square feet filtration area or more and usually include some level of automation for separation of the filtered solids from the filter apparatus and for handling and subsequent processing thereafter. Furthermore, other parts of the process are specifically arranged to generate suitable solids for cake filtration necessary for high volume. Filters of this type are thus an integral component in the process and as would be expected, a substantial capital investment for the business.

In contrast, polishing filters are typically used to remove incidental or other unwanted solids from a moving liquid or other fluid stream. The main purpose of polishing filter is to keep the filtrate clean for maintenance purposes, product appearance purposes, or where a high purity in the moving fluid is necessary. One example of an application where a polishing filter would be useful is in a closed loop cooling water system. Typical polishing filters handle a very low volume of solids and are usually small i.e. less than 20 square feet of filtration area and are inexpensive. Therefore, they are considered to be an ancillary part of the overall manufacturing or process system. Usually, therefore, it would be uneconomical to use a solids preparation step and a process filter in a polishing filter application.

A problem arises, however, when a polishing filter is placed in a situation to handle more than a small volume of solids. The typical solution is often the installation of several bag or cartridge filters in parallel. However, this solution increases the cost by adding additional equipment and manpower.

Although there have been attempts to increase the filtration area in bag and cartridge filters, one fundamental problem remains in that both the housings and replacement elements for both types of filters are typically cylindrical in shape. The cylindrical shape provides for a simple design and gives the components additional strength against the pressure of filtration and permits easy replacement of the elements. However, cylindrical filters limit the filtration area for a given filter apparatus volume.

According to the above, therefore, there is a need in the art for a leaf filter apparatus useful in applications where heretofore polishing filters were utilized. The leaf filter apparatus should be physically overall small, inexpensive, yet capable of filtering a substantial volume of incidental or unwanted solids from a moving fluid. Additionally, the filter leafs are preferably made of a disposable material and are easily detachable from the filter apparatus structure.

BRIEF DESCRIPTION

In accordance with one aspect of the present application, a polishing filter apparatus is provided comprising a housing defining a cavity, a manifold in the housing, and a plurality of replaceable filter leafs selectively movable through an opening in the housing and attachable to the manifold at a plurality of attachment areas. The housing includes a fluid inlet port receiving fluids into the housing cavity and an outlet port for expelling the fluids from the housing cavity. Further, a lid member is provided on the housing adjacent an opening defined in the housing. The lid member is movable between a closed position sealing the opening and an opened position permitting access into the cavity through the opening. The manifold in the housing is coupled to the outlet port and includes a plurality of attachment areas. The manifold is adapted to conduct a fluid flow of filtrate between the outlet port and the plurality of attachment areas. The plurality of replaceable filter leafs are selectively movable through the opening and are attachable with the manifold at the plurality of attachment areas. Preferably, the plurality of attachment areas include a plurality of connection regions defining a plurality of virtual attachment axes extending through the opening defined by the housing. The plurality of replaceable filter leafs include a plurality of nozzle members slidably connectable with the plurality of connection regions of the plurality of attachment areas along the plurality of virtual attachment axes.

In accordance with a further aspect of the present invention, a replaceable filter leaf apparatus is provided for use in an associated filter system including a housing having a cavity with fluid inlet and outlet ports for conducting a flow of fluids into an out from the housing and having a manifold coupled to the outlet port. In a first embodiment, the replaceable filter leaf includes a filter envelope consisting of a single substantially rectangular filter panel defining a first opening and being bent along a crease line, a nozzle member on the filter panel and defining a passageway adjacent the opening for conducting fluids therethrough, and a grid member contained within the filter envelope. In its preferred form, the creased filter envelope is a rectangular filter panel including a first pair of opposite first and second edges defining respective first and second peripheral regions, and a second pair of opposite third and fourth edges defining respective third and fourth peripheral regions. The crease line extends between and divides the third and fourth edges into respective first and second portions. The first and second peripheral regions of the first and second edges are mutually connected. The first and second portions of the third peripheral region of the third edge are mutually connected, and the first and second portions of the fourth peripheral region of the fourth edge are mutually connected. Preferably, the first opening is formed at the crease line but can be located anywhere on the rectangular filter panel as desired.

In accordance with yet a further embodiment of the present application, a replaceable filter leaf apparatus is provided for use in an associated leaf filter including a housing having a cavity with fluid inlet and outlet ports for conducting a flow of fluids into and out from the housing and having a manifold coupled to the outlet port. The filter leaf of this further embodiment comprises a filter element consisting of first and second rectangular filter panels directly connected substantially entirely along their respective edges, a nozzle member defining a passageway, and a grid member contained between the filter panel portions. In their preferred form, the first and second rectangular filter panel portions of the filter element are directly connected substantially entirely along their respective edges leaving a first seam therealong and defining a filter space therebetween. The nozzle member is fastened to the first and second filter panel portions adjacent the first seam. The passageway defined by the nozzle member is in fluid communication with the filter space through the gap between the rectangular filter panel portions.

In accordance with yet a further embodiment of the present application, a replaceable leaf filter apparatus is provided for use with an associated filter system including a housing having a cavity with fluid inlet and outlet ports for conducting a flow of fluids into and out from the housing and having a manifold coupled to the outlet port. The filter leaf apparatus comprises a filter envelope consisting of a single substantially rectangular filter panel bent along a crease line, a nozzle member disposed in a seam between edges of the rectangular filter panel formed by the crease line, and a grid member contained within the space between opposed portions of the creased rectangular filter panel. In its preferred form, the filter panel of the filter envelope includes first and second opposed edges defining respective first and second peripheral regions, and a second pair of opposed third and fourth edges defining respective third and fourth peripheral regions. The filter panel is bent along a crease line extending between and dividing the third and fourth edges into respective first and second portions, wherein the first and second peripheral regions of the first and second edges are mutually connected along a first seam, the first and second portions of the third peripheral region of the third edge are mutually connected along a second seam, and the first and second portions of the fourth peripheral region of the fourth edge are mutually connected along a third seam. The nozzle member is preferably disposed in at least one of the first, second, and third seams and defines a passageway for conducting fluids therethrough. The grid member is contained within the filter envelope and is adapted to conduct fluids therethrough.

BRIEF DESCRIPTION OF THE DRAWINGS

FIGS. 3a, 3b, and 3c are side, end and enlarged views of a filter system using replaceable filter leafs in accordance with a fourth preferred embodiment of the present application;

FIG. 4b is a cross-sectional view taken along line 4b-4b of FIG. 4a;

FIG. 5b is a cross-sectional view taken along line 5b-5b of FIG. 5a;

FIG. 10 is a cross-sectional view of a third adapter assembly in accordance with the present application;

FIG. 11 is a partial cross-sectional view of a fourth adapter assembly in accordance with the present application;

FIG. 12 is a cross-sectional view of a fifth adapter assembly in accordance with the present application;

FIG. 13 is a partial cross-sectional view of a sixth adapter assembly in accordance with the present application;

FIGS. 15a-15c are partial cross-sectional views of an eighth adapter assembly in accordance with the present application;

FIGS. 16a-16c are partial cross-sectional views of a ninth adapter assembly in accordance with the present application;

FIGS. 17a-17c are partial cross-sectional views of a tenth adapter assembly in accordance with the present application;

DETAILED DESCRIPTION OF EMBODIMENTS

Figure 1:
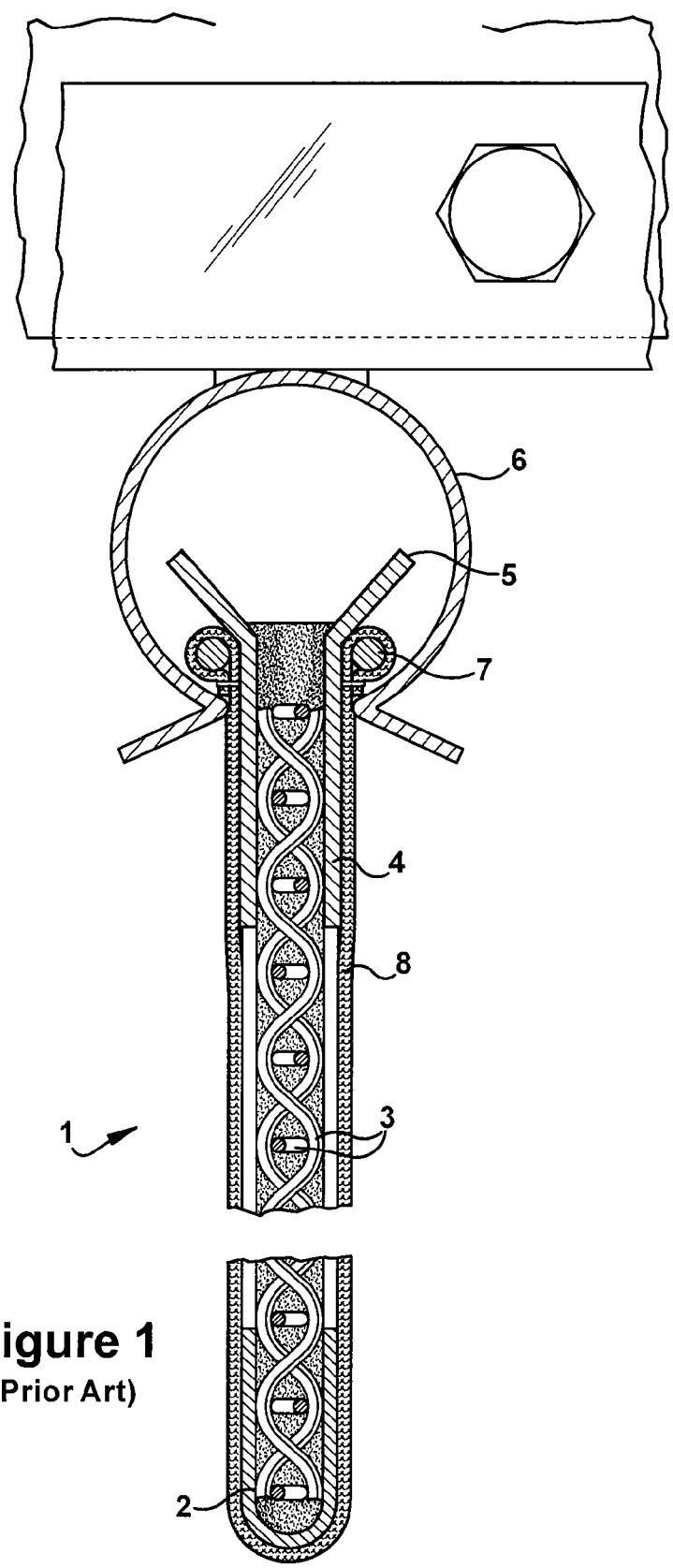
FIG. 1 is a cross-sectional view of a filter leaf apparatus formed in accordance with the prior art.

With reference now to the figures wherein the showings are for purposes of illustrating the invention only and not for purposes of limiting same, FIG. 1, shows a cross-sectional view of a prior art replaceable filter leaf device 1 formed in accordance with the prior art. As shown there, the filter leaf 1 includes a rigid rectangular open frame 2 in which is disposed a screen 3. The rigid frame 2 has channels formed therein and also has portions 4 overlying opposite sides of the screen 3 along the edges of the screen. The upper edge of the frame 2 includes outwardly diverging or inclined flanges 5 which cooperate with an inherently resilient split tubular member or header 6 which serves both as a discharge member for the filter element 1 and for clamping the corded edge 7 of a filter bag 8 on the frame 2.

In assembling the part of the filter leaf 1, the filter frame 2 is initially separated from the split tubular member 6 and the cloth bag 8 is drawn upwardly and snugly over the frame with the beaded edges at the mouth of the bag underlying the flanges 5 at opposite sides of the frame. Thereupon, the assembled bag and frame are slid into one end of the split tubular element 6 with the free edges of the tubular element disposed beneath the beads 7 on the bag as shown in the figure. The inherent resiliency of the header member 6 firmly holds the bag on the frame and the beads 7 on the bag are held in contact with the walls of the header member 6 which incline upwardly and outwardly from the edges of a longitudinal slot formed in the header member 6.

One disadvantage to the prior art filter leaf 1 illustrated in FIG. 1 is that the outer filter bag 8 is utilized in both a filter capacity as well as in a sealing capacity. More particularly, the filter bag 8 is held in contact with the outer edges of the header member 6 which, as described above, is resiliently biased to capture the filter leaf 1 in a longitudinal groove formed therein. It is considered that the use of the filter bag as an interface at the connection surfaces is disadvantageous because the filter bag provides a poor seal and, further, causes undue friction between the filer leaf and header portion making it difficult to remove the filter leaf for replacement.

Figure 2A:
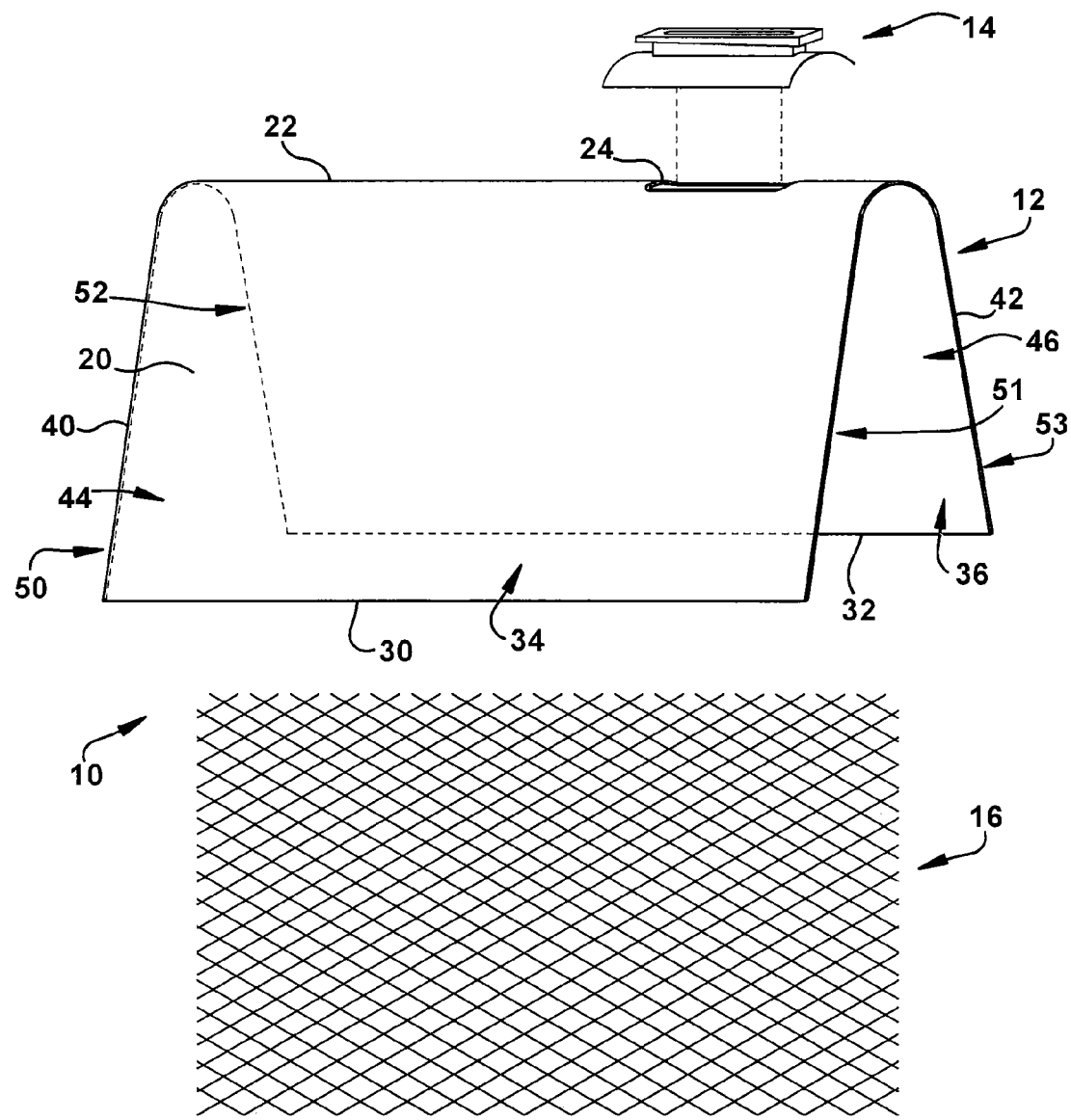
FIG. 2a is an exploded oblique view of a filter leaf apparatus formed in accordance with a first preferred embodiment of the present application.

With reference to FIG. 2a, a replaceable filter leaf apparatus 10 formed in accordance with an embodiment of the present application is shown in exploded view. In application, the subject filter leaf is used with an associated filter system (not shown) including a housing having a cavity with fluid inlet and outlet ports for conducting a flow of fluids into and out from the housing. The typical associated filter system includes a manifold coupled to the outlet port and the leaf filter apparatus is adapted for coupling with the manifold.

As shown in the figure, the subject filter leaf apparatus 10 includes a filter envelope 12, a nozzle member 14, and a grid member 16. The filter envelope 12 consists of a single substantially rectangular filter panel 20 provided for surrounding and containing the grid member 16 therein. In the first preferred embodiment of the subject application, the filter panel 20 is bent along a crease line 22 which intersects a first opening 24 defined by the filter panel 20.

As noted above, in its preferred form, the filter panel has a substantially rectangular conformation and includes a first pair of opposite first and second edges 30, 32 defining respective first and second peripheral regions 34, 36, respectively. A second pair of opposite third and fourth edges 40, 42 defines respective third and fourth peripheral regions 44, 46, respectively.

Figure 2B:
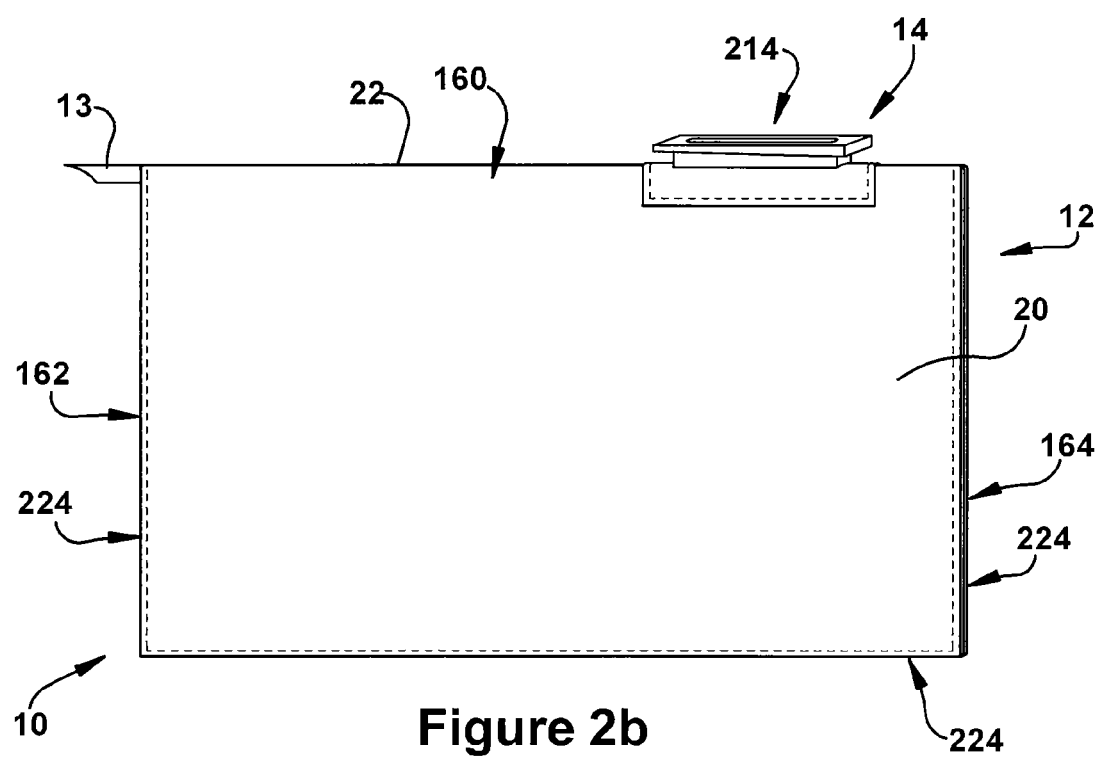
FIG. 2b is an assembled oblique view of the replaceable filter leaf apparatus in accordance with the first preferred embodiment of the present application.

In the first preferred embodiment illustrated in FIGS. 2a and 2b, the filter panel 20 is folded along the crease line 22 in a manner to divide the third and fourth edges 40, 42 into respective first and second portions 50, 52, and 51, 53, respectively.

It is to be appreciated that the filter panel 20 forming the filter envelope 12 is folded along the crease line 22 to surround and enclose the grid member 16 into a final conformation as illustrated in FIG. 2b. Preferably, in order to maintain a proper seal, the edges of the filter panel 20 are sealed using suitable fastening means. More particularly, the first and second peripheral regions 34, 36 of the first and second edges 30, 32 are mutually connected. Further, the first and second portions 50, 52 of the third peripheral region 44 are mutually connected. Lastly, the first and second portions 51, 53 of the fourth peripheral region 46 are mutually connected.

Many techniques may be used for sealing the edge regions of the rectangular filter panel using processes and methods now known or hereinafter developed. Preferably, however, the first and second peripheral regions 34, 36 of the first and second edges 30, 32 are mutually stitch connected. Similarly, a stitch connection is used to connect and thereby seal the first and second portions 50, 52 of the third peripheral region 44 and, likewise, to seal the first and second portions 51, 53 of the fourth peripheral region 46. As noted, however, other techniques may be used including but not limited to connecting the respective edges and regions using a glue bond or by ultrasonic welding, or the like. Preferably, the nozzle member 14 is stitch connected to the filter panel 20 although other techniques can be used as well such as by gluing or otherwise bonding the nozzle with the panel.

In the first preferred embodiment illustrated in FIGS. 2a and 2b, the first opening 24 defined by the rectangular filter panel 20 is positioned at the crease line 22. However, alternative embodiments are contemplated within the scope of the present application including the constructions illustrated in FIGS. 2c and 2d. As shown there, the nozzle member 114, 115 in each of the alternative preferred embodiments is disposed along a seam or gap at the selected one or more edges of the filter panel elements. Many other nozzle locations are possible as well. Each of the preferred embodiments of the subject leaf filter includes, optionally a support member 13 (FIG. 2b) extending from the filter panel at a position spaced from the nozzle member 14 for supporting the filter envelope relative to an associated structure.

Figure 2C:
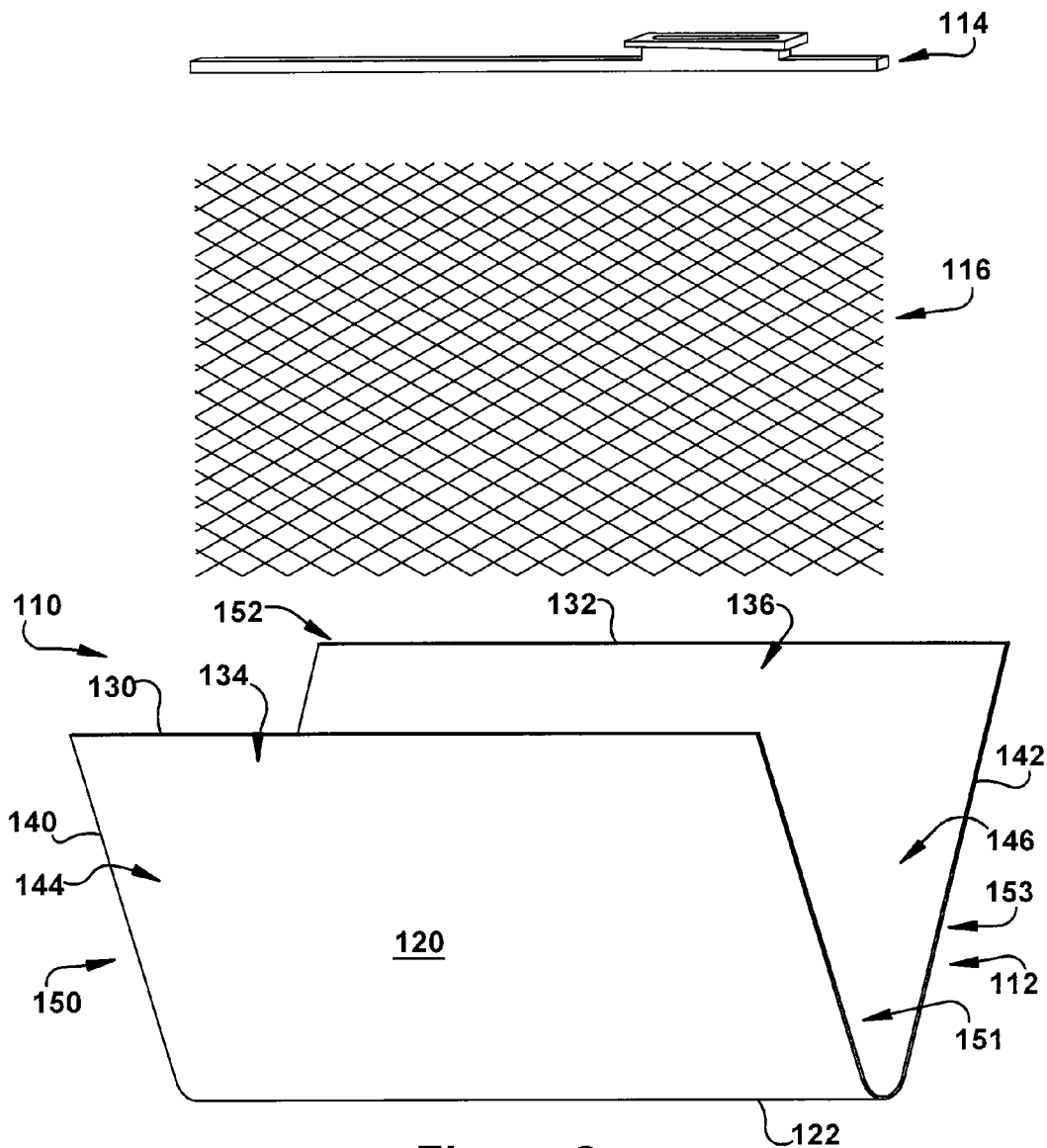
FIG. 2c is an exploded oblique view of a replaceable filter leaf apparatus formed in accordance with a second preferred embodiment of the present application.

FIG. 2c shows a filter leaf apparatus 110 formed in accordance with a second preferred embodiment of the invention in exploded view. As shown there, the filter leaf apparatus 110 includes a filter envelope 112 folded along a crease line 122 to form, when folded over, an upwardly oriented pocket adapted to receive a grid member 116 therein. A nozzle member 114 is provided for conducting a flow of fluids from the leaf filter apparatus 110 to an associated filter system (not shown) having a suitable manifold adapted to receive the nozzle member 114. The filter envelope 112 consists of a single substantially rectangular filter panel 120 including a first pair of opposite first and second edges 130, 132 defining respective first and second peripheral regions 134, 136, and a second pair of opposite third and fourth edges 140, 142 defining respective third and fourth peripheral regions 144, 146, respectively. The filter panel is bent along a crease line 122 as noted above which extends between and divides each of the third and fourth edges 140, 142 into respective first and second portions 150, 152 and 151, 153.

Figure 2D:
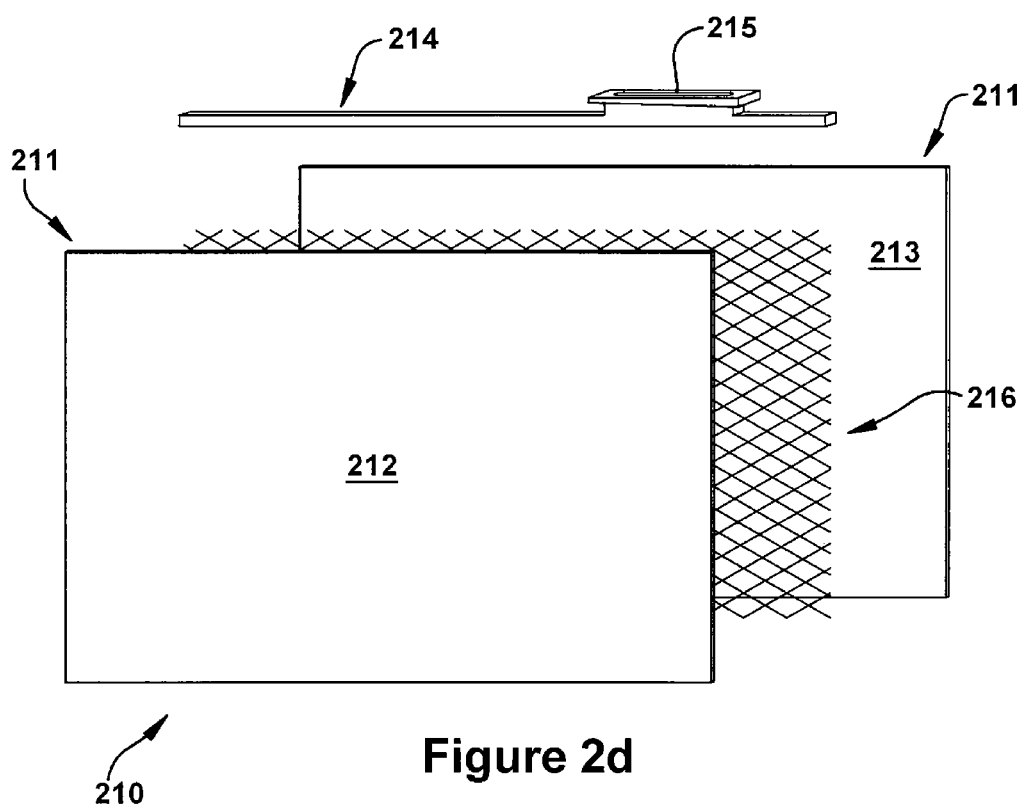
FIG. 2d is an exploded oblique view of a replaceable filter leaf apparatus found in accordance with a third preferred embodiment of the present application.

The second preferred embodiment filter leaf apparatus 110 is sealed at its edges in an assembled condition to form a leaf filter having a size and shape similar to the embodiment shown in FIG. 2d. Using FIG. 2d to illustrate the relative arrangement of parts in the assembled condition of the second preferred embodiment, the first and second peripheral regions 134, 136 of the first and second edges 130, 132 are mutually connected along a first seam 160. Similarly, the first and second portions 150, 152 of the third peripheral region 144 of the third edge 140 are mutually connected along a second seam 162. Lastly, the first and second portions 151, 153 of the fourth peripheral region 146 of the fourth edge 142 are mutually connected along a third seam 164. In that way, the folded over filter panel 120 forms a sealed pocket adapted to receive the grid member 116 therein.

In its preferred form, the grid member 116 is disposed in the spacing between opposite halves of the filter panel to provide a mechanical spacing therebetween and, further, to provide a plurality of fluid channels for conducting fluid between opposite portions of the filter panel.

Still further in connection with the second preferred embodiment, as noted above, the peripheral regions of the filter panel 120 can be sealed using any means presently available or hereinafter developed including, without limitation, by mutually stitch-connecting the edges. Further, the present application contemplates connecting the edges by means of a glue bond, an ultrasonic weld interface, or any similar or equivalent techniques. After the edges of the filter panel are sealed, the fluid opening defined by the nozzle member 114 conducts a flow of fluids through the filter panel. The nozzle member 114 is stitch connected, glued or otherwise bonded or welded to the filter panel.

With reference next to FIGS. 2d and 2b, a third preferred embodiment of the subject replaceable leaf filter apparatus 210 is shown in both exploded (FIG. 2d) and assembled (FIG. 2b) conformations. Again, FIG. 2b is used to illustrate the relative arrangement of parts in the assembled condition of the third preferred embodiment. With particular reference to FIG. 2d, the subject filter leaf apparatus 210 includes a filter element 211 which includes first and second rectangular filter panel portions 212 and 213. A nozzle member 214 is provided in the subject leaf filter apparatus 210 together with a grid member 216 as shown. The first and second rectangular filter panel portions 212, 213 of the filter element 211 are connected substantially entirely along their respective edges at a first continuous seam 224 therealong and defining a filter space therebetween. The nozzle member is affixed or fastened to the first and second filter panel portions 212, 213 adjacent the first seam 224 as shown best in FIG. 2b. The nozzle member, in its preferred form, defines a passageway 215 in fluid communication with the filter space defined between the filter panel portions 212, 213.

In its preferred form, the nozzle member 214 extends through the first seam 224 defined between the first and second filter panel portions 212, 213. The grid member 216 is adapted to provide a mechanical spacing between the first and second panel portions as well as providing a fluid channel for conducting fluid between the panel portions.

It is to be appreciated that the filter panel portions are mutually connected at their respective edges by any known means including, but not limited to, a stitch connection, by means of a glue bond, ultrasonic welding, or by any other methods or techniques. Also, the nozzle member 214 is connected with the filter panel portions 212 and 213 by a stitch connection, glue bonding, welding or any other known methods.

FIGS. 3a-3c show a polishing filter apparatus 400 in accordance with a further preferred embodiment of the present application. As shown there, the polishing filter apparatus 400 comprises a housing 402 defining a cavity 404 therein, a manifold 406 disposed within the cavity 404 of the housing 402, and a plurality of replaceable filter leafs 408 selectively attachable with the manifold 406. In its preferred form as illustrated, the housing 402 includes a fluid inlet port 410 adapted to receive fluids into the housing cavity 404, a fluid outlet port 412 for expelling the fluids out from the housing cavity 404, and a lid member 414 hingedly connected to the housing 404 and disposed adjacent an opening 416. The lid member 414 is movable between a closed position (not shown) sealing the opening 416 and an opened position (FIG. 3a) permitting access into the cavity through the opening 416.

The manifold 406 is operatively coupled with the outlet port 412 and includes a plurality of attachment areas 420 therealong adapted to couple with nozzle members on associated filter leaf apparatus of the type described above. The manifold 406 is adapted to conduct a fluid flow between the outlet port 412 and the plurality of attachment areas 420. A plurality of replaceable filter leafs 10 are selectively movable through the opening 416 and attachable with the manifold 406 at said plurality of attachment areas 420.

With continued reference to FIGS. 3a-3c, the polishing filter apparatus 400 includes a plurality of connection regions 440 at the attachment areas 420, wherein each of the plurality of connection regions defines a virtual attachment axis 425 best shown in FIG. 3a. The attachment axis extends through the opening 416 defined by the housing 402 in a direction into and out of the page in FIGS. 3b, 3c and within the plane of the page in FIG. 3a. During use of the subject polishing filter apparatus, replacement filter leafs are inserted into and out from the cavity along the plurality of mutually parallel axes 425 defined by the plurality of connection regions 440.

Figure 4A:
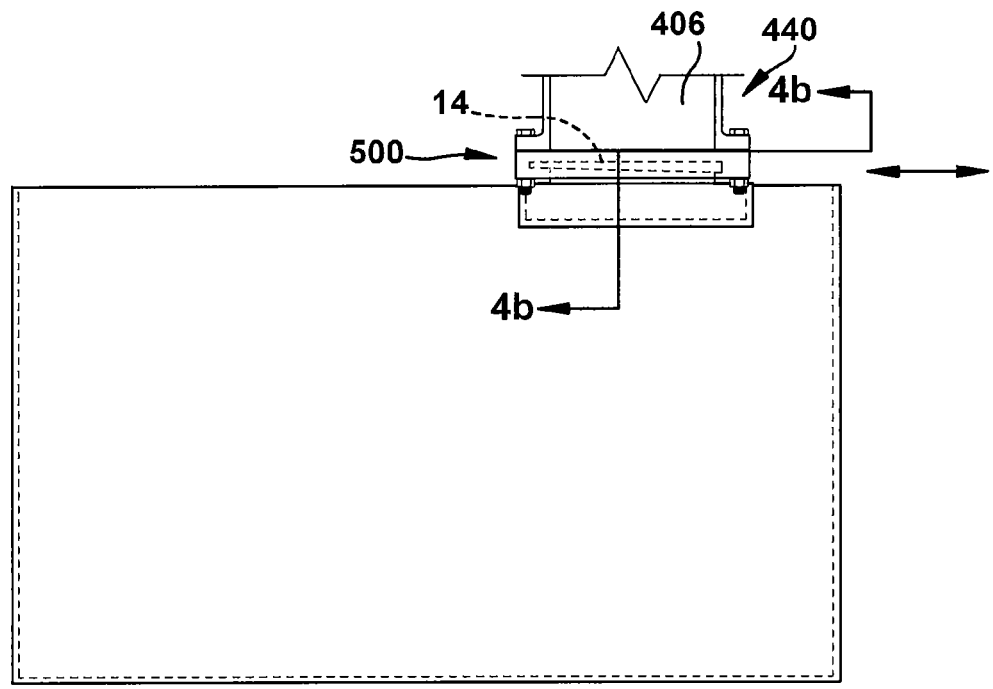
FIG. 4a is an elevational view of an embodiment of a replaceable filter leaf apparatus supported on a header assembly using a first adapter arrangement.
Figure 4B:
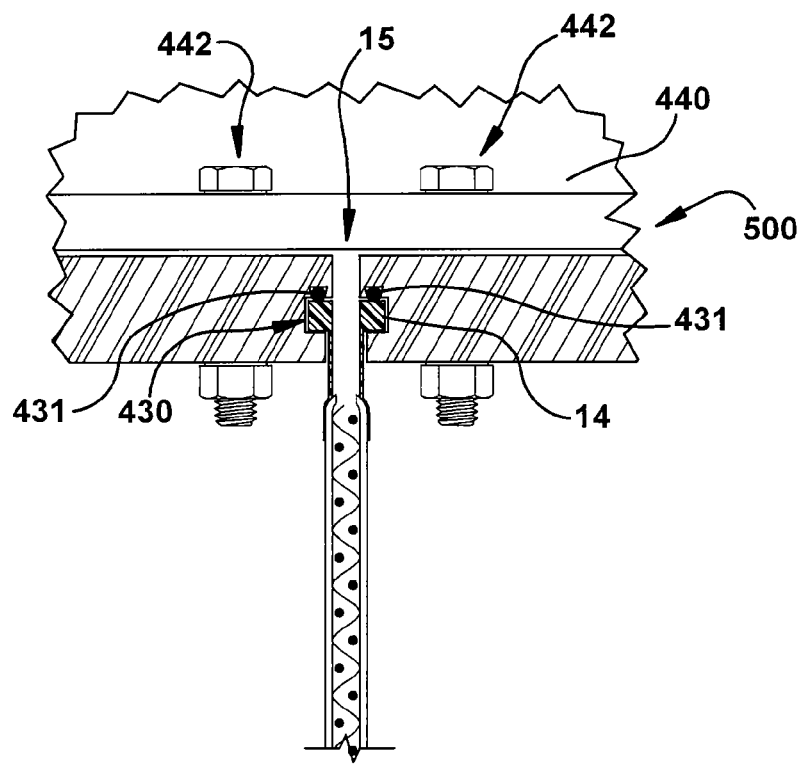

Preferably, the plurality of nozzle members 14, 114, 214 on each of the plurality of filter leafs 10 are slidably connectable with the plurality of connection regions 440 along the plurality of virtual attachment axes 425. This enables the leaf to be easily slid into and out of the opening of the housing for an efficient overall polishing filter apparatus system. The nozzle members of each of the filer leaf embodiments are adapted to slidably interface with manifold of the filter apparatus for ease of replacement and maintenance. To that end, FIG. 4b is a partial cross-sectional view of an interface 500 formed between a nozzle member 14 and an associated connection region 440 of a manifold 406 taken along line 4b-4b in FIG. 4a. In the embodiment illustrated, the nozzle member 14 is slidably received in a pocket region 430 of the associated connection region 440 and a seal is created using suitable gaskets 431 such as O-rings or the like carried on the nozzle member 14 or manifold 440.

Figure 5A:
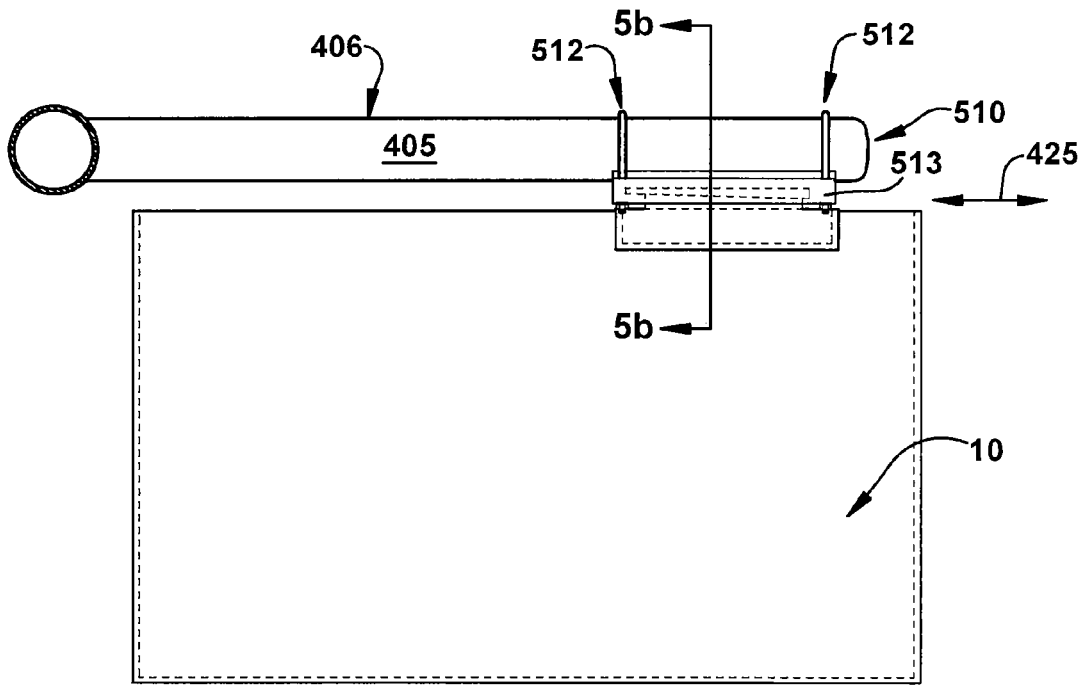
FIG. 5a is an elevational view of an embodiment of a replaceable filter leaf apparatus supported on a branch pipe manifold using a second adapter arrangement.
Figure 5B:
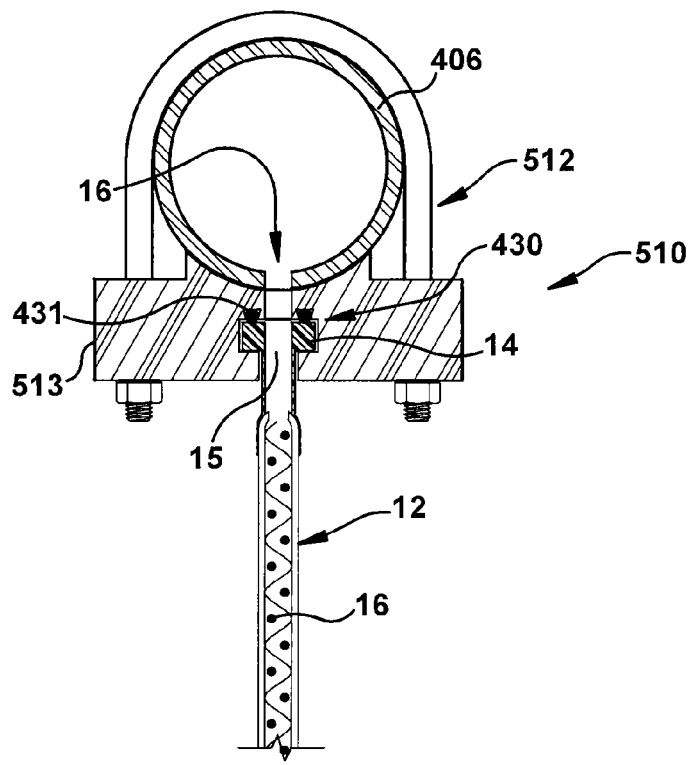

In FIGS. 5a and 5b, a slidable interface 510 is illustrated in accordance with yet a further embodiment of the application. As illustrated in FIG. 5a, a filter leaf apparatus 10 is attached with a manifold 406 of a polishing filter apparatus (not shown) using an interface 510 adapted to slidably receive the filter leaf apparatus relative to the manifold. FIG. 5b is a cross-sectional view taken along line 5b-5b of FIG. 5a. The interface includes a pair of U-shaped fasteners 512 attached to a lower interface portion 513 using suitable bolts or other fasteners. The U-shaped attachment member 512 is adapted to surround and slidingly receive a hollow tubular portion 405 of the manifold 406 therein. Further, the lower interface portion 513 is adapted to slidingly receive the nozzle member 14 in a pocket region 430 thereof. Gaskets 431 such as O-rings carried on the nozzle member seal the nozzle member with the interface 510. A passageway 15 is defined in the nozzle member 14 and is in fluid communication with a slot 16 defined in the hollow tubular portion 405 for conducting fluid from the pocket defined by the filter envelope 12 using passageways defined by the grid member 16. In the embodiment illustrated, the manifold 406 is substantially circular cylindrical although other conformations are contemplated with the scope of the present application such as, for example, rectangular cylindrical or any other irregular shape or form cylindrical. Using the arrangement illustrated, the plurality of filter leaf apparatus 10 are slidably received onto the manifold 406 along an installation axis 425.

Figure 6A:
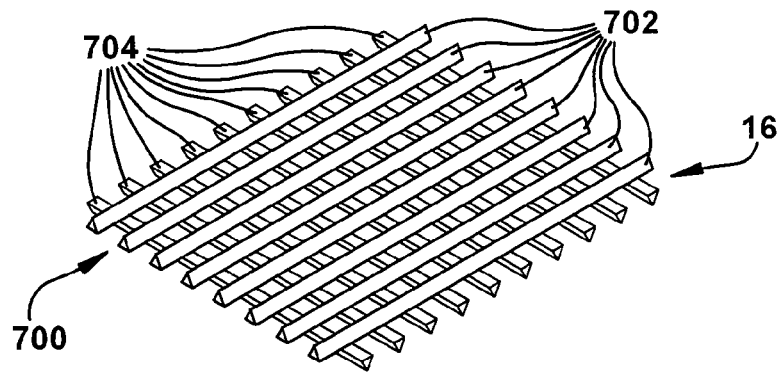
FIGS. 6a-6c are isometric views showing alternative forms of a grid member used in the subject replaceable filter leaf apparatus of the present application.
Figure 6B:
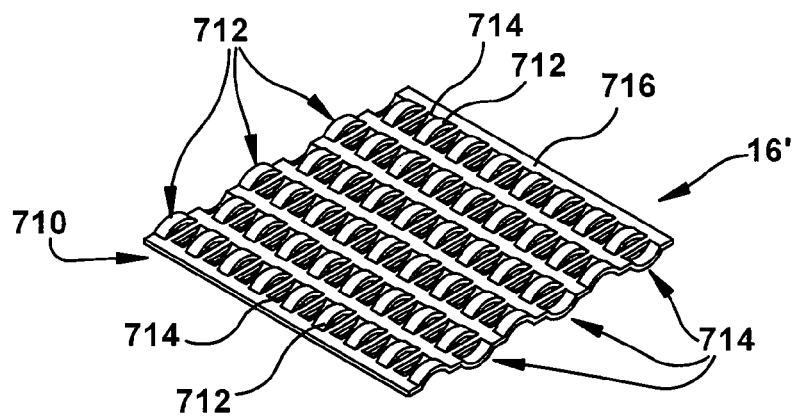
Figure 6C:
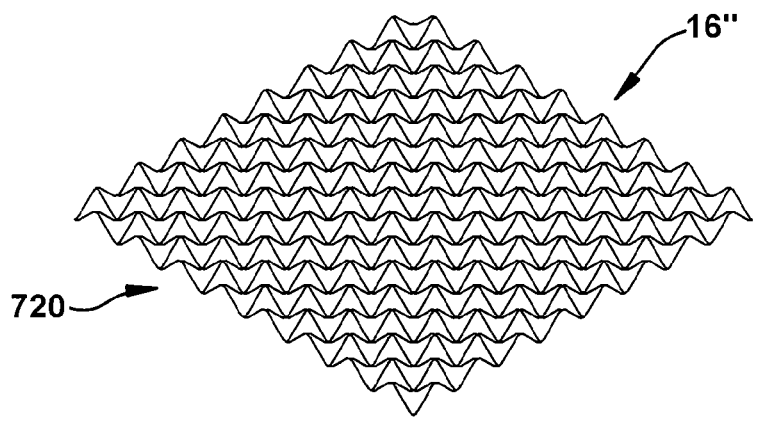

FIGS. 6a-6c show alternative preferred embodiments of the grid member 16 comprising part of the subject filter leaf apparatus of the subject application. In FIG. 6a, the grid member 16 comprises a porous stick 700 formed of a plurality of stacked plastic rods 702, 704 arranged to define passageways therebetween. In the embodiment illustrated, only two layers of stacked plastic rods are illustrated including a first row of rods 702 and a second row of rods 704 arranged in a transverse orientation relative to the first row 702. However, it is to be appreciated that two or more layers of stacked rod can be used. Further, although the rods are illustrated in a perpendicular stack arrangement between adjacent layers, other orientations of rods can be used as well such as oblique and/or obtuse arrangements or orientations between rows.

FIG. 6b shows grid 16' including a punched-out gridwork 710 forming channels therebetween. Preferably, the punch-out gridwork 710 is a plastic construction. However, stainless steel or other corrosion resistant materials can be used as well. The punched out grid 710 is formed in the preferred embodiment illustrated as a series of punched up half circles 712 interlaced with a series of punched down half circles 714. Each of the half circles 712, 714 define a partial circular passageway perpendicular to the plane of the grid sheet 716 as well as a rectangular opening in the plane of the grid sheet 716.

Lastly, FIG. 7c shows an egg carton construction 720 for defining passageways between opposite portions of the filter envelope and assembled into the subject filter leaf apparatus. It is to be appreciated that the grid 11 provides a mechanical spacing between opposed portions of the filter panel. As well, the grid member provides a fluid channel for conducting fluid between the opposed portions of the filter panel.

Figure 7A:
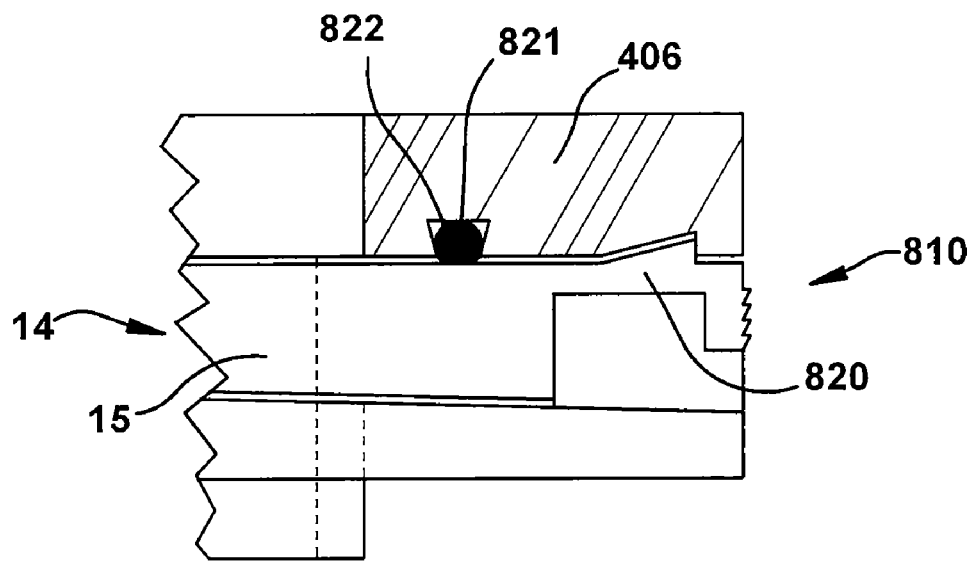
FIGS. 7a and 7b are side and top views in partial cross section showing locking mechanisms for securing the replaceable filter leaf apparatus of the application with a manifold in a polishing filter system.
Figure 7B:
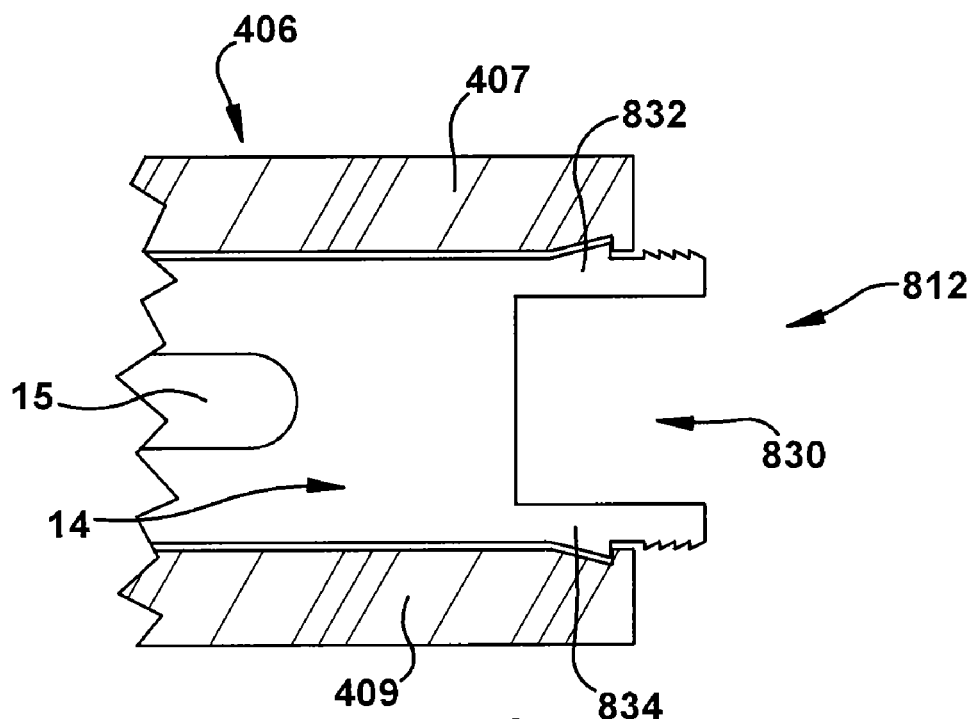

Turning now to FIGS. 7a and 7b, further embodiments of a latching mechanism 810, 812 are illustrated. In FIG. 7a, the latching mechanism 810 includes a resilient tab member 820 which is biased into engagement with an overhead manifold portion 406 having a groove 821 defined therein adapted to receive a suitable seal member 822 such as an O-ring for example. FIG. 7b shows a latch mechanism 812 comprising a fork area 830 having opposed resiliently biased fork portions 832, 834 which, in the position illustrated, are relaxed and biased to engage opposed walls 407, 409 of the manifold 406. In operation, the opposed fork portions 832, 834 are squeezed together against their bias for sliding into the opposed walls 407, 409 of the manifold 406. Thereby, the nozzle 14 is latched into and received into the manifold 406.

Figure 8:
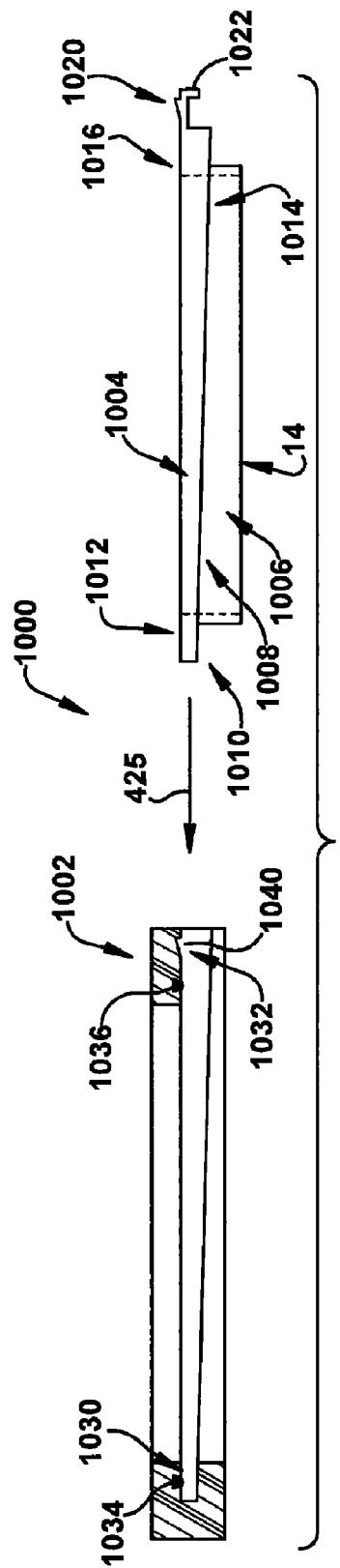
FIG. 8 is a partial cross-sectional view of a first adapter assembly for connecting a replaceable filter leaf with a manifold in accordance with the present application.

FIG. 8 shows yet a further latch mechanism 1000 for selectively coupling in an interlocking fashion a nozzle member 14 with an associated attachment area 1002 of a manifold (not shown) contained within a housing cavity of an associated polishing filter apparatus. In the embodiment illustrated, the nozzle member 14 includes an upper enlarged region 1004 and a lower narrow region 1006. The upper enlarged region together with the lower narrow region collectively form a substantially T-shaped nozzle as viewed in cross section. Further, preferably, the upper enlarged region 1004 includes a lower tapered surface 1008 which provides a narrow front region 1010 on a lead end 1012 of the nozzle member 14 and a thick rear region 1014 on a trailing end 1016 of the nozzle member 14.

In addition to the above, the trailing end 1016 of the nozzle member 14 carries a resilient latching tab 1020 with a downwardly extending hook portion 1022 and an upwardly extending latch tab 1024.

It is to be appreciated that the latch mechanism 1000 is adapted for insertion into a similarly shaped attachment area 1002 of an associated filter manifold. To that end, the attachment area 1002 includes a narrow distal receiving end 1030 and a widened proximal receiving area 1032 adapted to closely receive the lead end 1012 and the trailing end 1016 of the nozzle member 14, respectively. A suitable sealing member 1034, preferably in the form of an O-ring is received in a groove 1036 defined in the attachment area 1002 of the associated manifold. In that way, a fluid seal is established between the attachment area 1002 and the nozzle member 14 of the subject latch mechanism 1000 when the nozzle is inserted into the attachment area.

In order to ensure that the nozzle member is suitably held in place, a tapered latch groove 1040 is provided on the underside of the attachment area 1002. The latch groove is adapted to receive the latching tab 1020 when the nozzle member is inserted into the attachment area 1002.

Figure 9:
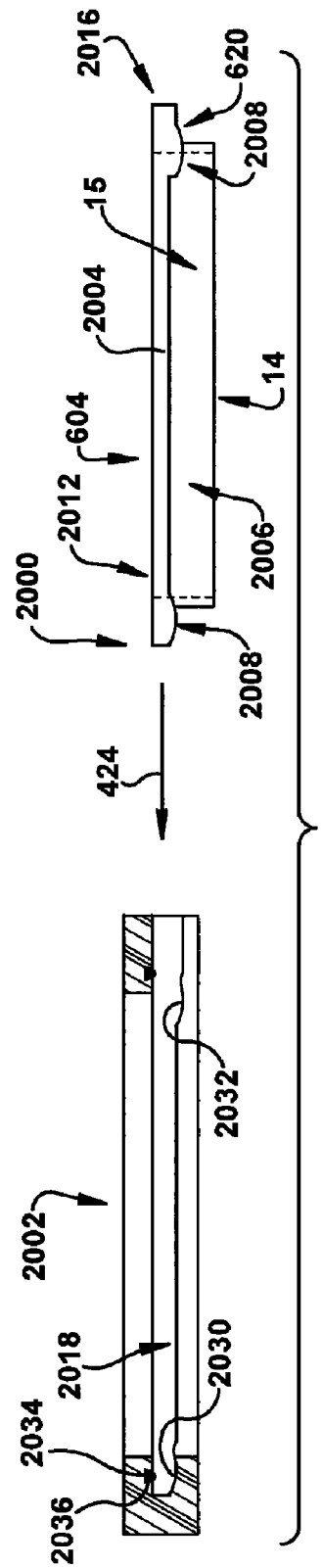
FIG. 9 is a partial cross-sectional view of a second adapter assembly in accordance with the present application.

Turning next to FIG. 9, yet a further latch mechanism 2000 is illustrated including a nozzle member 14 and an attachment area 2002 of an associated manifold in a polishing filter apparatus (not shown). In the embodiment illustrated, the nozzle member 14 is inserted along an insertion axis 425 into the attachment area 2002. An enlarged region 2004 is formed on an upper end of the nozzle member 14 and a narrow region 2006 is provided on the lower portion of the nozzle member 14. Overall, the enlarged region 2004 and the narrow region 2006 form an overall "T" shaped nozzle member 14.

The upper enlarged region 2004 of the nozzle member 14 includes a lower raised surface 2008 which is provided on the nozzle member surrounding the passageway 15 thereof. In the embodiment illustrated, the lower raised surface 2008 has a semi-circular conformation. However, as understood by those skilled in the art, any other surface can be used.

With continued reference to FIG. 9, the attachment area 2002 of the associated manifold defines a suitable opening 2018 adapted to closely receive the upper and lower regions 2004, 2006 of the nozzle member 14. A sealing member 2034 is carried in a groove 2036 formed in the underside of the attachment area 2002. In addition, the attachment area 2002 includes a lower curved tapered surface 2030 adapted to receive the lower raised surface 2008 on a lead end 2012 of the nozzle member 14. Similarly, a curved tapered surface 2032 is provided in the attachment area for receiving the lower raised surface 2008 on the trailing end 2016 of the nozzle member 14. Essentially, the nozzle member 14 is "snap-fitted" into the attachment area 2002 by the interaction of the lower raised surface 2008 received in the curved receiving areas 2030, 2023.

Turning next to FIG. 10, yet a further latch mechanism embodiment 3000 is illustrated. As shown there, the latch mechanism 3000 includes an attachment area 3002 adapted to receive a substantially T-shaped nozzle member 14. In the embodiment illustrated, the nozzle member 14 is inserted into the polishing filter apparatus along a substantially L-shaped path 426 having a substantial portion thereof being in parallel with the preferred axes 425 discussed above in detail. However, in the embodiment illustrated, the latch mechanism 3000 enables the filter leaf (not shown) carried on the nozzle member 14 to be inserted in an upward direction as viewed in the figure.

The nozzle member 14 includes an enlarged upper region 3004 and a narrow lower region 3006. In addition, the passageway 15 defined in the nozzle member 14 includes an upper enlarged circular area 3018 adapted to receive a corresponding barb portion 3019 defined on a lower leg 3020 defined on the lower surface of the attachment area 3002. The lower leg 3020 essentially circumscribes the passageway 16 formed in the attachment area 3002 and, when received into the corresponding region 3018 of the nozzle 14, forms a fluid seal therebetween. It is to be appreciated that in the embodiment illustrated in FIG. 10, an upper surface 3030 of the nozzle 14 is mechanically seated against the lower surface 3032 of the attachment area 3002 to provide a sound mechanical and fluid interconnection therebetween.

Turning next to FIG. 11, yet another further latch mechanism 4000 is illustrated in connection with the present application. As shown there, the latch mechanism 4000 includes an attachment area 4002 adapted to receive a suitable configured nozzle member 14 of a filter leaf formed in accordance with the present application. The nozzle 14 includes an enlarged region 4004 and a narrow region 4006. The enlarged region 4004 is essentially a ring-shaped area having an upper surface 4030 adapted to engage an underside or lower surface 4032 of the attachment area 4002. In addition, an upper leg 4020 is formed on an upper side of the nozzle 14 and carries an outwardly extending barb portion 4019 for providing a sound connection between the nozzle 14 and the associated attachment area 4002. To that end, the attachment area includes a barb-shaped recess or groove 4034 defined in the passageway 16 thereof. In use, the nozzle member 14 is moved along a substantially L-shaped path 426 which, as illustrated, is substantially along the preferred insertion axis 425 described above in detail. However, the filter leaf carried on the nozzle 14 is ultimately installed onto the attachment area 4002 of the manifold in an upward direction as viewed in the figure.

Turning next to FIG. 12, yet still another further latch mechanism 5000 is illustrated. As shown, an attachment area 5002 is adapted to receive a similarly shaped nozzle 14 along an insertion pathway 426 which, as noted above, is substantially L-shaped and includes a major portion along the preferred insertion axis 425 described above. However, the nozzle 14 is inserted ultimately in an upward direction as shown in the drawing figure.

The nozzle 14 includes an upper enlarged region 5004 and a lower narrow region 5006. This gives the nozzle member 14 an overall T-shaped configuration. In addition to the above, the nozzle member 14 includes a groove 5010 adapted to receive a similarly shaped lower leg 5012 carried on the underside of the attachment area 5002. The leg 5012 carries a barb 5019 for connection with a similarly shaped connecting surface 5020 of the nozzle 14.

It is to be appreciated that in the embodiment illustrated in FIG. 12, the lower leg 5012 is spaced away from the passageway 16 extending through the attachment area 5002 to form a substantially annular contact surface 5030 adapted to contact with an engage for a fluid type connection with an upper surface 5032 of the nozzle member 14. This is useful when the negative pressure within the subject filter apparatus is significant. In that way, the surface 5030 prevents or otherwise discourages portions of the nozzle member 14 from being drawn into the passageway 16 owing to a substantial negative pressure.

Turning next to FIG. 13, yet a still further latch mechanism 6000 is illustrated. With reference now to that figure, an attachment area 6002 includes a continuous groove 6004 defined on an underside 6006 thereof. The continuous groove 6004 is adapted to receive a correspondingly shaped upper leg 6010 formed at an upper narrow region 6008 of the nozzle member 14. A barb 6011 is carried on the leg 6010 and is adapted to be received in a suitably shaped barb region 6013 defined in the groove 6004. In that way, the barb carried on the nozzle member, when received in the corresponding groove, effectively latches the nozzle member 14 to the attachment area 6002.

It is to be appreciated in FIG. 13 that the underside 6006 of the attachment area 6002 includes a continuous contact area 6030 defined in the gap between the groove 6004 and the passageway 16. The contact surface 6030 forms an effective mechanical and fluid seal between the underside 6006 of the attachment area 6002 and an upper surface 6038 of the nozzle member 14. In that way, portions of the nozzle member 14 are prevented from being drawn into the passageway 16 when the subject filter is operated under extreme negative pressures.

Figure 14:
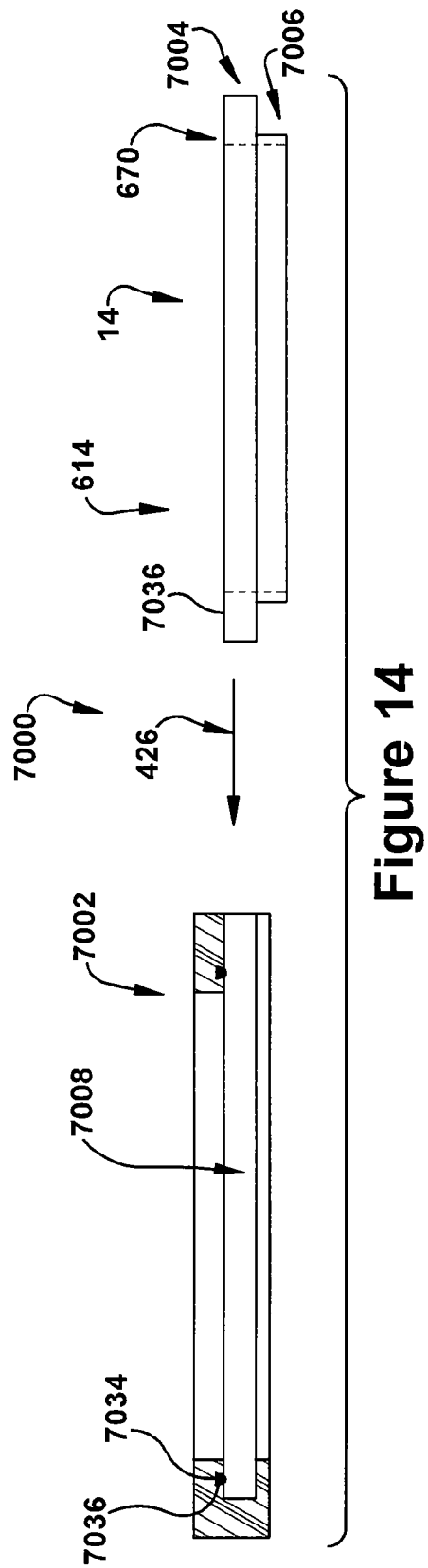
FIG. 14 is a partial cross-sectional view of a seventh adapter assembly in accordance with the present application.

Turning next to FIG. 14, yet a further latch mechanism 7000 is illustrated and includes an attachment area 7002 adapted to receive a suitably shaped nozzle member 14 therein. As illustrated, the nozzle member 14 is inserted into an opening 7018 formed at the attachment area 7002 along an insertion axis 425. The nozzle member 14 includes an upper enlarged region 7004 and a lower narrow region 7006. The upper enlarged region together with the lower narrow region forms a substantially T-shaped nozzle member as viewed in cross section. The lead end 7012 of the nozzle member 14 includes a narrow front region 7010 and, similarly, the trailing end 7016 includes a narrow rear region 7014. It is to be appreciated that in the embodiment illustrated in FIG. 14, the thickness of the front and rear regions 7010, 7014 on the lead and trailing ends 7012, 7016, are similarly sized. To that end, the latch mechanism 7000 illustrated is essentially a friction fit scheme.

A sealing member 7034 is carried in a groove 7036 defined on the underside of the attachment area 7002. During use, the sealing member 7034 mechanically engages an upper surface 7036 of the nozzle 14 to establish a fluid seal therebetween.

FIGS. 15a-15c show yet still a further latch mechanism 8000 formed in accordance with the present application. As shown there, an attachment area 8002 includes an outwardly projecting lip member 8004 adapted to be received in a correspondingly shaped grooved area 8006 defined between upper and lower extension members 8010, 8012 formed on opposite sides of a passageway 15 defined by the nozzle member 14. In that way, the nozzle member 14 is received onto the attachment area 8002 by insertion thereof along the preferred insertion axis 425. Essentially, in the embodiment illustrated, the upper and lower portions 8010, 8012, capture the outwardly extending lip portion 8004 therebetween.

Turning next to FIGS. 16a-16c, yet still a further latch mechanism 9000 is illustrated. As shown there, an attachment area 9002 includes a hollow region 9004 for fluid communication between the attachment area 9002 and a correspondingly formed nozzle member 14. The attachment area 9002 is substantially C-shaped in cross section as best shown in FIG. 16c. As illustrated there, the passageway 9004 of the attachment area 9002 communicates on left and right sides 9010, 9012 of the nozzle member for efficient fluid communication along a pathway P.

As shown in FIG. 16b, a tab member 9020 is carried on the trailing end 9016 of the nozzle member 14. A barb 9018 is formed on the tab 9016 for selective latching receipt into a corresponding groove latch 9020 formed in the attachment area 9002. In this way, the nozzle member 14 can be securely latched into the attachment area 9002.

Turning next to FIGS. 17a-17c, still yet a further latch mechanism 10000 is illustrated for connecting a filter leaf 10 to an associated manifold 406 along an insertion axis 427. In the embodiment illustrated, the nozzle member 14' includes an elongated contact portion 10100 stitch connected or otherwise connected to a filter panel portion of the filter leaf 10. As shown, the contact portion 10100 includes a U-shaped receiving area 10102 forming an inwardly-shaped receiving area 10104 best shown in FIG. 17c for receiving an outwardly projecting lip portion 10106 of the manifold 406. In the embodiment illustrated, the filter leaf 10 is inserted along the insertion axis 427 for a connection between the manifold and the filter leaf at a side of the filter leaf.

Figure 18A:
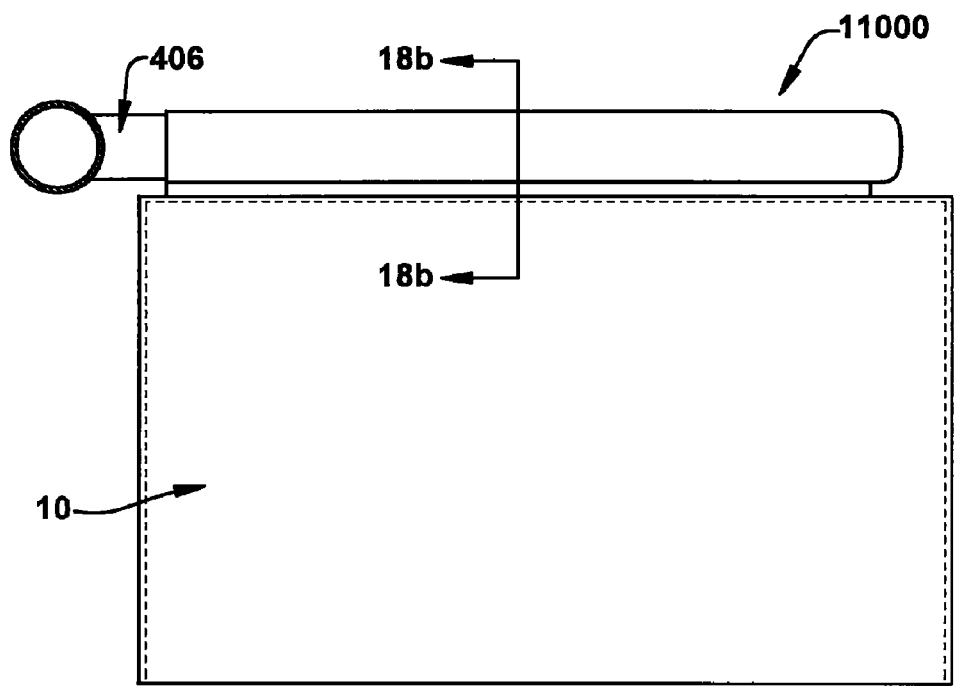
FIGS. 18a, 18b are partial cross-sectional views of an eleventh adapter assembly in accordance with the present application.
Figure 18B:
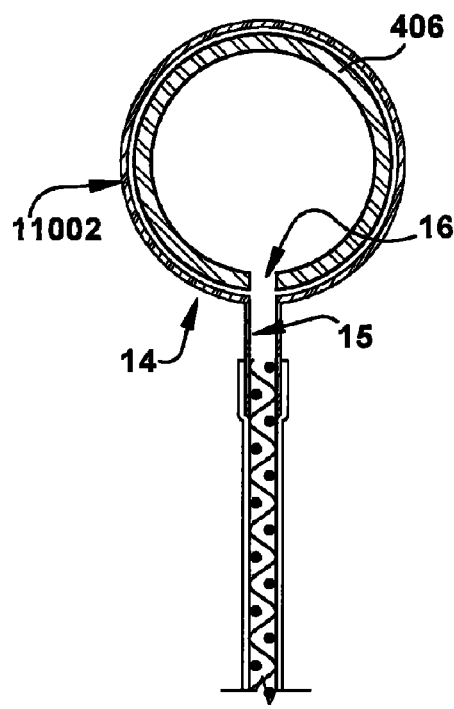

Turning next to FIGS. 18a and 18b, yet still a further latch mechanism 11000 is illustrated. As shown there, a filter leaf 10 is adapted for sliding receipt onto an elongate manifold 406. As shown in cross section in FIG. 18b, the manifold 406 defines an elongate slit 16 in fluid communication with a passageway 15 defined in the nozzle member 14. In the embodiment illustrated, the nozzle member 14 includes an outer circular member 11002 adapted to slidingly receive over the circular cylindrical manifold portion 4006. This is best illustrated in FIG. 18b. Essentially, in the embodiment illustrated, the filter leaf 10 carrying the nozzle member 14 is slid onto the elongated manifold 406.

Figure 19A:
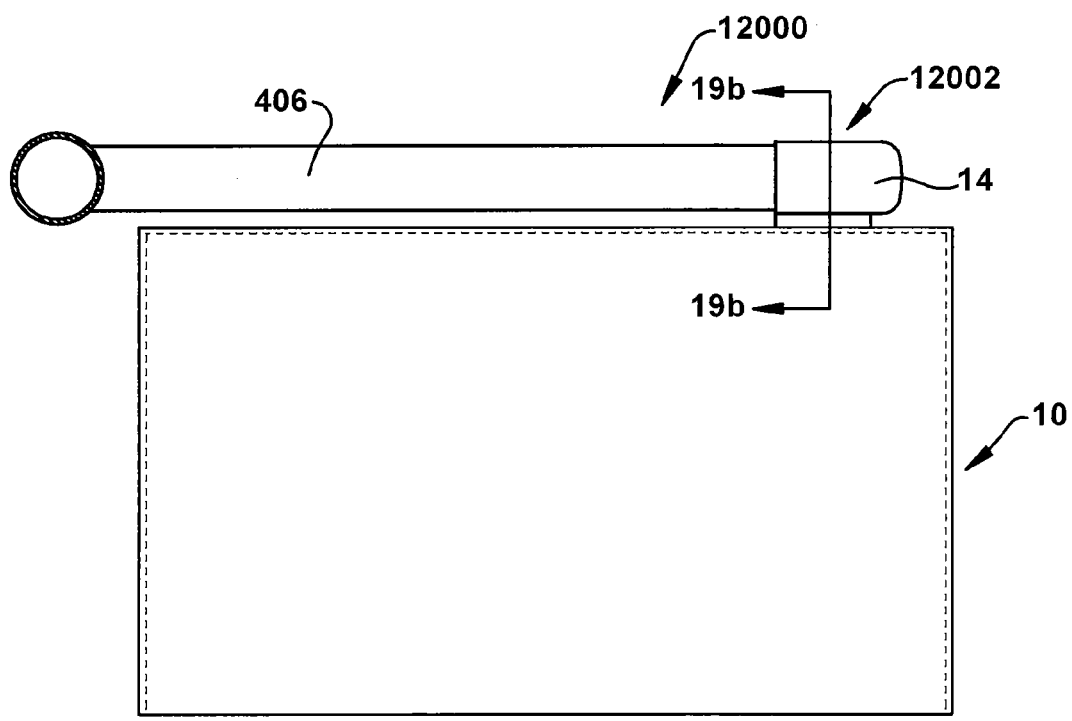
FIGS. 19a, 19b are partial cross-sectional views of a twelfth adapter assembly in accordance with the present application.
Figure 19B:
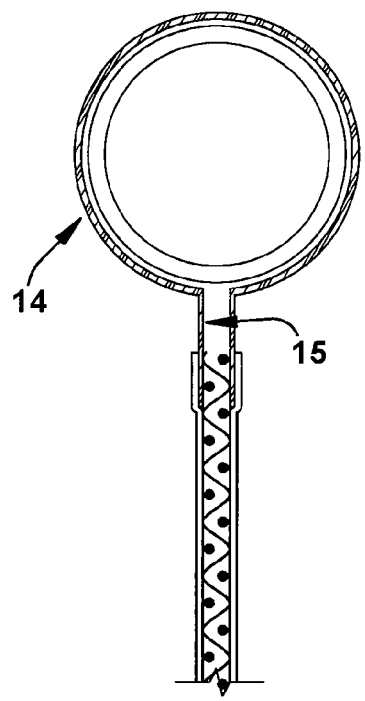

FIGS. 19a and 19b illustrate a still further embodiment of a latch mechanism 12000 formed in accordance with yet a further embodiment of the invention. As shown there, the manifold 406 is an essentially elongated tubular structure adapted to receive on a first end 12002 the nozzle member 14 of the leaf filter 10. In the figure, the leaf filter 10 is carried on the manifold 406 so that fluid communication is established only between the end of the manifold 406 and a corresponding passageway 15 formed in the nozzle member 14.

Figure 20A:
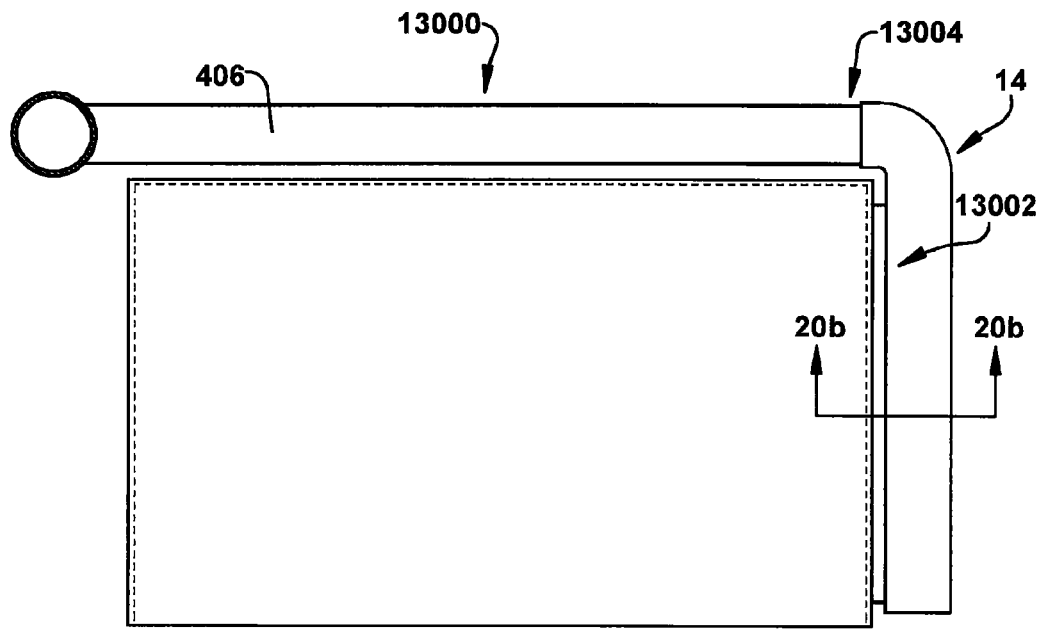
FIGS. 20a, 20b are partial cross-sectional views of a thirteenth adapter assembly in accordance with the present application; and, FIGS. 21a, 21b are partial cross-sectional views of a fourteenth adapter assembly in accordance with the present application.
Figure 20B:
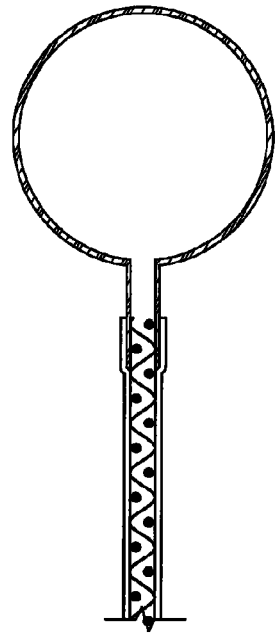

FIGS. 20a and 20b show yet still a further latch mechanism embodiment 13000 formed in accordance with the present application. In that embodiment, the nozzle member 14 is essentially an elongated tubular member 13002 adapted for snap fitting onto an end 13004 of the manifold 406.

Figure 21A:
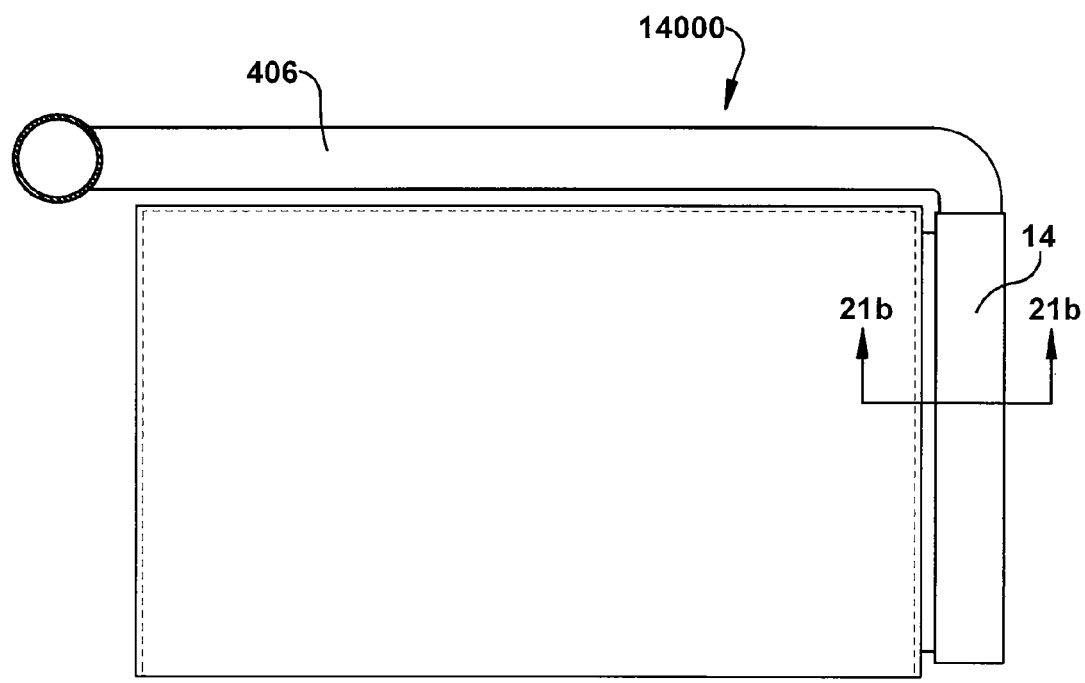
Figure 21B:
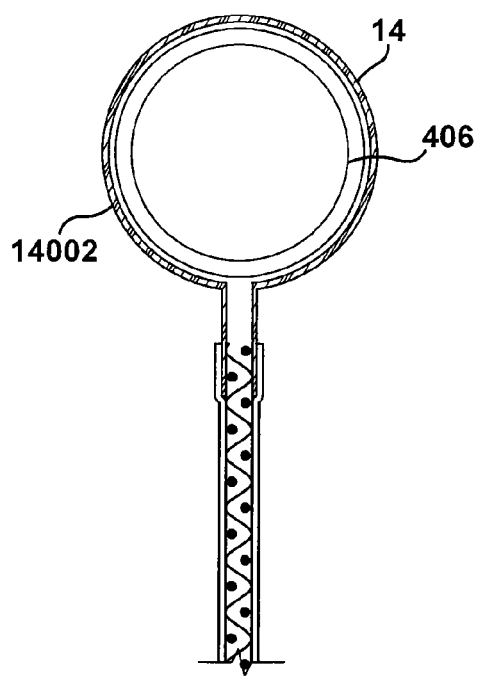

Lastly, FIGS. 21a and 21b show yet still further another and additional latch mechanism 14000 including a nozzle member 14 adapted for sliding connection onto a manifold 406 in an upward direction as viewed in the figure. As shown in cross section in FIG. 21b, the nozzle member 14 includes a circular portion 14002 adapted to surroundingly receive the tubular manifold 406 therein.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A replaceable filter leaf apparatus for use in an associated filter system including a housing having a cavity with fluid inlet and outlet ports for conducting a flow of fluids into and out from the housing and having a manifold operatively coupled with the outlet port, the filter leaf apparatus comprising:
    a drainage grid member defining a plane and comprising at least one channel for directing a fluid to flow in one or more directions substantially parallel with the plane defined by the drainage grid member;
    a porous filter media disposed adjacent the drainage grid member for filtering the fluid entering the grid member; and,
    a nozzle adapter member operatively coupled with the drainage grid member and the porous filter media, the nozzle adapter member defining an elongate passageway for conducting fluids therethrough along a first direction within the nozzle adapter member, the nozzle adapter member adapting the filter leaf apparatus for selective slidable connection with the manifold of the associated filter system in a second direction substantially perpendicular to the first direction, wherein a sealing portion of the nozzle adapter member is configured to generate a seal in a sealing plane between a margin surface surrounding an outlet of the elongate passageway of the nozzle adapter member and the associated manifold by biasing the nozzle adapter member against the associated manifold along an axis substantially perpendicular to the sealing plane.

2. The replaceable filter leaf apparatus according to claim 1 wherein said grid member is adapted to provide i) a mechanical spacing between opposed portions of said filter media, and ii) a fluid channel for conducting fluid between said opposed portions of the filter media.

3. The replaceable filter leaf apparatus according to claim 1 further including:
    a support member extending from said filter media at a position spaced from said nozzle member for supporting said filter envelope relative to an associated structure.

4. The replaceable filter leaf apparatus according to claim 1 wherein said nozzle member is T-shaped.

5. A polishing filter apparatus comprising:
    a housing defining a cavity and having: i) a fluid inlet port receiving fluids into the housing cavity, ii) an outlet port for expelling said fluids out from the housing cavity, and iii) a lid member on said housing adjacent an opening defined in the housing and movable between a closed position sealing said opening and an opened position permitting access into said cavity through said opening;
    a manifold coupled with said outlet port and having a plurality of attachment areas, the manifold being adapted to conduct a fluid flow between said outlet port and said plurality of attachment areas, the plurality of attachment areas including a plurality of connection regions defining a plurality of virtual attachment axes, the manifold being connected relative to the housing at a position wherein the plurality of virtual attachment axes extend through said opening defined by the housing; and,
    a plurality of replaceable filter media leafs selectively movable through said opening and slidably attachable with said manifold in first directions parallel to the plurality of virtual attachment axes at said plurality of attachment areas, each of the plurality of replaceable filter media leafs including a filter envelope and a nozzle adapter member connected with the filter media leaf, the nozzle adapter member being slidably connectable with a one of the plurality of connection regions of the plurality of attachment areas in the first direction parallel to the virtual attachment axis and defining an elongate passage for conducting said fluids therethrough in a second direction perpendicular to the first direction, the nozzle adapter member adapting the replaceable filter media leaf for selective connection with the manifold and including a sealing portion biasing the nozzle adapter member against the manifold in a bias direction forming a seal between the nozzle adapter member and the manifold in a substantially planar sealing plane perpendicular to the bias direction.

6. The polishing filter apparatus according to claim 5 wherein:
said plurality of virtual attachment axes are mutually parallel; and,
said plurality of replaceable filter media leafs are slidably attachable with said plurality of connection regions along said plurality of parallel virtual attachment axes.

7. A replaceable filter leaf apparatus for use in an associated filter system including a housing having a cavity with fluid inlet and outlet ports for conducting a flow of fluids into and out from the housing and having a manifold coupled to the outlet port, the filter leaf apparatus comprising:
a filter envelope consisting of a porous filter media; and,
a nozzle adapter member in operative fluid communication with the filter media and defining an elongate passageway for conducting fluids in a first direction therethrough, the nozzle adapter member adapting the filter leaf apparatus for selective connection with a manifold of an associated filter system and being formed of a substantially resilient material and including a connection portion adapted for slidable connection with the manifold of the associated filter system along a virtual attachment axis in a second direction perpendicular to said first direction, the nozzle adapter member including a sealing portion biasing the nozzle adapter member against the manifold along a biasing axis to generate a seal between the nozzle adapter member and the manifold in a substantially planar sealing plane perpendicular to the biasing axis.

8. The replaceable filter leaf apparatus according to claim 7 wherein said nozzle member extends through a first opening defined by said filter media.

9. The replaceable filter leaf apparatus according to claim 7 further comprising: a grid member adapted to provide i) a mechanical spacing between opposed portions of said filter media, and ii) a fluid channel for conducting fluid between said opposed portions of the filter media.

10. The replaceable filter leaf apparatus according to claim 7 further including:
a support member extending from said filter media at a position spaced from said nozzle member for supporting said filter envelope relative to an associated structure.

11. The replaceable filter leaf apparatus according to claim 7 wherein said connection portion is adapted for said slidable connection with the manifold of the associated leaf filter along the virtual attachment axis to enable the filter leaf apparatus to be easily slid onto and off from the manifold of the associated filter system by movement of said filter leaf apparatus relative to said filter system along said virtual attachment axis in said second direction.

12. The replaceable filter leaf apparatus according to claim 11 wherein the manifold of the associated filter system defines a pocket region and said nozzle member is T-shaped for slidable receipt in the pocket region.

13. The replaceable filter leaf apparatus according to claim 12 further including a gasket carried on the nozzle member for creating a seal between the nozzle member and the manifold of the associated filter system.

14. The replaceable filter leaf apparatus according to claim 11 wherein said nozzle member defines a latch configured to selectively couple the filter leaf with the manifold of the associated filter system.

15. The replaceable filter leaf apparatus according to claim 14 wherein said latch includes a resilient tab member biased into engagement with a groove defined by the manifold of the associated filter system.

16. The replaceable filter leaf apparatus according to claim 14 wherein said latch includes opposed resiliently biased fork portions configured to engage opposed walls of the manifold of the associated filter system.

17. The replaceable filter leaf apparatus according to claim 7 wherein the connection portion of said nozzle adaptor member is formed of a plastic material.

18. The replaceable filter leaf apparatus according to claim 17 wherein the connection portion is tapered in said second direction.

* * * * *